(12) United States Patent
Sullivan et al.

(10) Patent No.: US 12,445,359 B1
(45) Date of Patent: Oct. 14, 2025

(54) SYSTEM AND METHOD FOR UNIFIED COMMUNICATION MONITORING

(71) Applicant: NWN Corporation, Exeter, RI (US)

(72) Inventors: James Patrick Sullivan, Ocean Ridge, FL (US); Doug Syer, Watertown, MA (US); John P. Lodge, Jr., Canton, MA (US); Jeremy Michael Maynard, High Point, NC (US)

(73) Assignee: NWN Corporation, Exeter, RI (US)

( * ) Notice: Subject to any disclaimer, the term of this patent is extended or adjusted under 35 U.S.C. 154(b) by 0 days.

(21) Appl. No.: 18/903,979

(22) Filed: Oct. 1, 2024

(51) Int. Cl.
*H04L 41/5003* (2022.01)
*H04L 41/14* (2022.01)
*H04L 43/02* (2022.01)
*H04L 43/0811* (2022.01)

(52) U.S. Cl.
CPC ........ *H04L 41/5003* (2013.01); *H04L 41/145* (2013.01); *H04L 43/02* (2013.01); *H04L 43/0811* (2013.01)

(58) Field of Classification Search
None
See application file for complete search history.

(56) References Cited

U.S. PATENT DOCUMENTS

| | | | |
|---|---|---|---|
| 6,381,316 B2 | 4/2002 | Joyce | |
| 6,805,254 B2 | 10/2004 | Pearce | |
| 6,912,388 B2 | 6/2005 | Yang | |
| 7,124,060 B1 | 10/2006 | Eriksson | |
| 8,411,594 B2 | 4/2013 | Black | |
| 8,761,358 B2 | 6/2014 | Biswas | |
| 9,531,886 B2 | 12/2016 | Wong | |
| 10,404,856 B2 | 9/2019 | Vandikas | |
| 11,153,177 B1* | 10/2021 | Hermoni | H04L 41/0859 |
| 11,630,718 B2 | 4/2023 | Malboubi | |
| 2015/0120856 A1* | 4/2015 | Bennett | H04L 41/14 |
| | | | 709/213 |
| 2018/0316588 A1* | 11/2018 | Miernik | H04L 41/5019 |
| 2019/0306023 A1* | 10/2019 | Vasseur | H04L 41/16 |
| 2020/0259722 A1* | 8/2020 | Kocberber | G06F 11/3409 |
| 2022/0360663 A1 | 11/2022 | Kempson | |
| 2023/0216762 A1* | 7/2023 | Shamdani | H04L 43/0811 |
| | | | 709/224 |
| 2024/0012734 A1* | 1/2024 | Lee | G06N 3/02 |
| 2024/0154884 A1* | 5/2024 | Jain | H04L 43/02 |

FOREIGN PATENT DOCUMENTS

| | | |
|---|---|---|
| CN | 104410694 B | 11/2017 |
| CN | 106598850 B | 5/2019 |
| CN | 107333281 B | 8/2019 |
| CN | 108845912 B | 8/2019 |
| CN | 115514627 A | 12/2022 |

* cited by examiner

*Primary Examiner* — Fadi Haj Said
(74) *Attorney, Agent, or Firm* — Dentons US LLP

(57) ABSTRACT

In a system and a method for unified communication monitoring, collecting, by a processor, a real time data of a unified communication system and correlating, by the processor, the real time data with a monitoring dataset, wherein the monitoring dataset uses a collection engine. Furthermore, linking, by the processor, the monitoring dataset with a model data, wherein the model data represents a current state and a configuration of the unified communication system and presenting, by the processor, a status of a service level object based on the monitoring dataset and the model data.

37 Claims, 14 Drawing Sheets

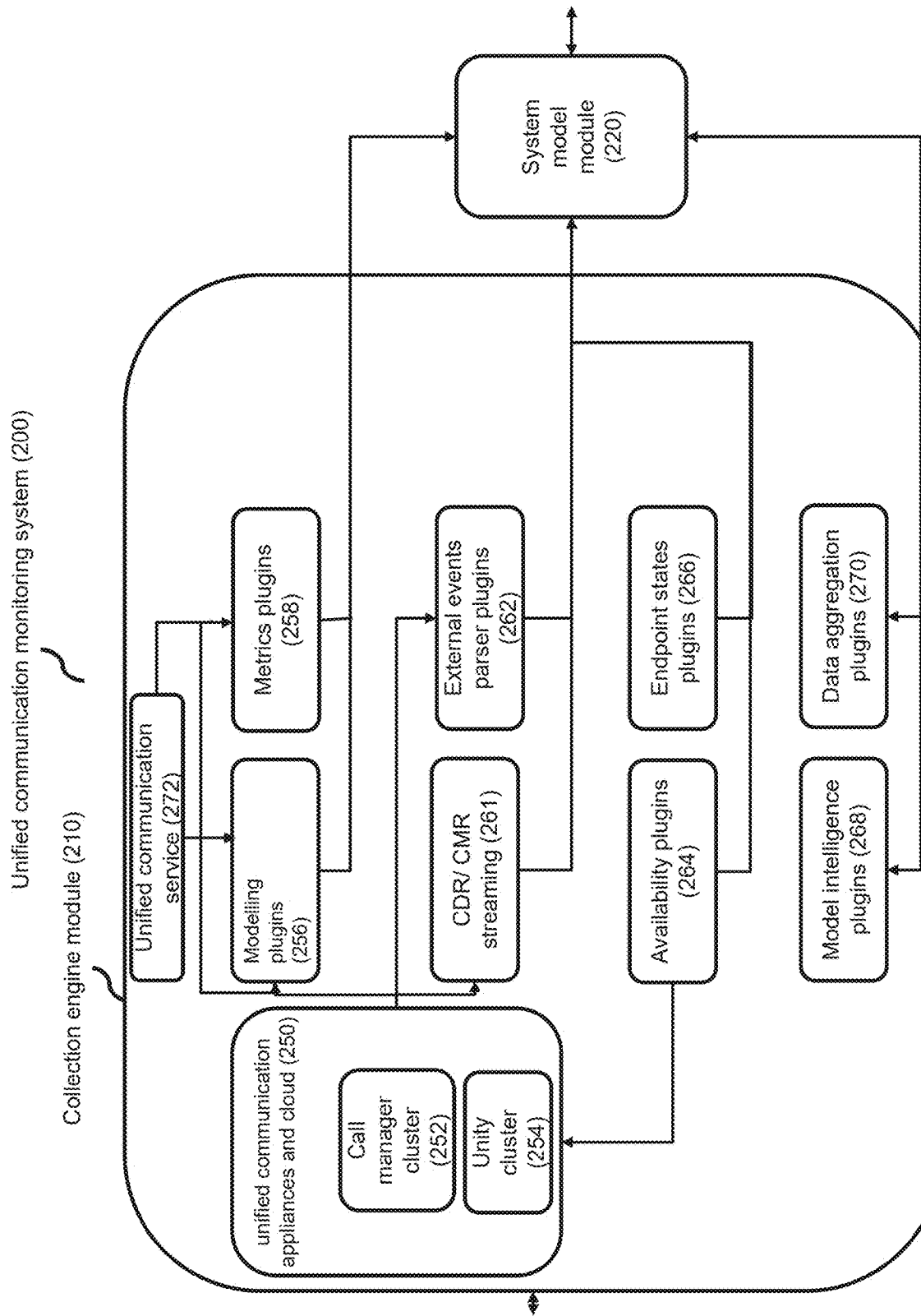

SYSTEM AND METHOD FOR UNIFIED COMMUNICATION MONITORING

FIELD OF THE INVENTION

The present disclosure generally relates to the field of unified communication, more specifically the present disclosure relates to a system and method for providing insights on unified communication monitoring.

BACKGROUND OF THE INVENTION

In the past, conventional telephone systems relied on a PBX connected via hardwired lines to phones within a dedicated network. These systems accessed the outside world through dedicated circuits to a local telephone company's branch, often known as a Central Office, which utilized dedicated equipment and pathways to connect calls to other telephone companies. Long-distance charges were substantial during this era, prompting companies to pay for multiple PBXs and dedicated connections between sites.

With the advent of private networks, leveraging existing data circuits for both voice and data transmission became advantageous. This approach allowed for local calls to be made without incurring costly long-distance charges. However, the internet was initially deemed too unreliable for critical voice and video communications. Nevertheless, companies could relinquish the need to own PBXs at every site, resulting in significant cost savings despite a slight decrease in reliability.

More recently, unified communications (UC) technologies have emerged, integrating voice, video, chat, and email with business data. Today, conducting video calls and recording them has become commonplace, alongside accessing customer data via chat and utilizing virtual whiteboards during calls. UC applications enable participants to join calls using various devices, including office phones, computers, or smartphones, further blurring the lines between traditional computers and telecommunications. It is commonplace today for a single UC experience to involve on premise infrastructure, multiple Cloud Unified Communications providers, multiple carriers, and even multiple loosely related cloud services consumed by end users.

The pandemic accelerated the adoption of and integration of hybrid on-premise and cloud technologies, with knowledge workers and call centres shifting to remote work. In parallel, the speed to initially implement solutions has greatly decreased however the choices have exploded, and thus companies rarely only have a single UC system. And these systems are almost always integrated with the network and a mix of on-premise and cloud business applications. In general, the complexity and strategic importance of UC has increased while the ability to control the systems has become more challenging.

Unlike moving general ledger systems to the cloud, UC presents a unique challenge due to its inherently hybrid nature. While parts of the system reside in the cloud, endpoints on computers connect to various systems in diverse ways. Companies often deploy connectivity devices in branch offices or homes to enhance security and quality of service.

However, as technology advances, supporting these complex systems becomes more demanding. Identifying the root cause of issues within UC systems is time-consuming, exacerbated by the significant impact on user experience when faced with network or systems-related problems. While email delays due to connectivity issues might go unnoticed, disruptions in voice or video UC applications lead to noticeable outcomes such as one-way audio, lost video feeds, and dropped calls. Additionally, unlike with application errors "dropped calls" are more often than not considered normal.

Troubleshooting such issues is particularly time-consuming, with background noise and data overload hindering efficient resolution. For some workers, such as help desk personnel reliant on specific applications, productivity losses are more significant than for others, like developers who can easily switch devices or locations.

This raises questions about setting Service Level Objectives (SLOs) for UC applications, measuring them, allocating resources to address issues, and determining what can be considered "background noise" tolerable by the organization. Balancing cost-effectiveness and reliability becomes crucial in this context.

Overall, navigating these challenges requires a strategic approach that considers factors such as reliability, cost, user experience, and remote work requirements. Additionally, organizations must invest in flexible and robust monitoring, troubleshooting, and support mechanisms to ensure the smooth operation of their UC systems. Thus, there exists a need to develop an automation platform that would address the three dimensions of an ecosystem: agility, efficiency, and experience.

SUMMARY OF THE INVENTION

This summary is provided to introduce concepts related to systems and methods for unified communications monitoring and the concepts are further described below in the detailed description. This summary is neither intended to identify essential features of the claimed subject matter nor is it intended for use in determining or limiting the scope of the claimed subject matter.

In one implementation, a method for unified communication monitoring is disclosed. The method comprises collecting, by a processor, a real time data of a unified communication system and correlating, by the processor, the real time data with a monitoring dataset, wherein the monitoring dataset uses a collection engine. The method further comprises linking, by the processor, the monitoring dataset with a model data, wherein the model data represents a current state and a configuration of the unified communication system and presenting, by the processor, a status of a service level object based on the monitoring dataset and the model data.

In yet another implementation, the monitoring dataset is a common monitoring data of events, metrics and current state.

In yet another implementation, the model data is collected periodically.

In yet another implementation, the model data is not collected for the events or metrics data stores without reference to some entity in the model database.

In yet another implementation, the model data reflects operating state and configured state of the unified communication system.

In yet another implementation, the model data follows a system architecture of the unified communication system.

In yet another implementation, the collection engine collects model, event, and metric data from servers and devices.

In yet another implementation, the method further comprises collecting, by the processor, an additional data from a networking equipment to provide additional events, performance data, and analytics.

In yet another implementation, the method further comprises preparing, by the processor, a user interface having a business and a technical logic for collecting the real time data, wherein the user interface has access to the monitoring data and the model data.

In yet another implementation, the method further comprises identifying, by the processor, an impacted service of the unified communication system by monitoring the unified communication system, wherein the identification assists in defining the status of the service level object.

In one implementation, a system for unified communication monitoring is disclosed. The system comprises a processor and a memory coupled to the processor, wherein the processor executes a plurality of modules stored in the memory. The plurality of modules further comprises a collection engine module for collecting a real time data of a unified communication system and a system model module for correlating the real time data with a monitoring dataset, wherein the monitoring dataset uses the collection engine module. The plurality of modules further comprises a model data interface module for linking the monitoring dataset with a model data, wherein the model data represents a current state and a configuration of the unified communication system and an analytics and user experience module for presenting a status of a service level object based on the monitoring dataset and the model data.

In yet another system implementation, the monitoring dataset is a common monitoring data of events, metrics and current state.

In yet another system implementation, the model data is collected periodically.

In yet another system implementation, the model data is not collected for the events or metrics data stores without reference to some entity in the model database.

In yet another system implementation, the model data reflects operating state and configured state of the unified communication system.

In yet another system implementation, the model data follows a system architecture of the unified communication system.

In yet another system implementation, the collection engine that collects model, event, and metric data from servers and devices.

In yet another system implementation, the system further comprises the collection engine module for collecting an additional data from a networking equipment to provide additional events, performance data, and analytics.

In yet another system implementation, the system further comprises an interface of the analytics and user experience module for preparing a user interface having a business and a technical logic for collecting the real time data, wherein the user interface has access to the monitoring data and the model data.

In yet another system implementation, the system further comprises a status of the analytics and user experience module for identifying an impacted service of the unified communication system by monitoring the unified communication system, wherein the identification assists in defining the status of the service level object.

It is an object of the present subject matter to provide an "Availability" metric on a per-endpoint basis, aiding in preventing cascading errors and reducing licensing and capacity planning costs by analyzing usage history.

It is an object of the present subject matter to allow for quick identification of network issues and suggest potential outages beyond the controlled infrastructure.

It is an object of the present subject matter to provide ease of maintenance, cost-effectiveness, and ability to collect and analyze data in near real-time without the need for extensive logging and with the ability to prevent additional observability into the systems being monitored.

It is an object of the present subject matter to offer clear visibility into phone states and issue reasons historically, work across cloud and non-cloud unified communication environments, and determine the impact of issues without costly raw log technologies.

It is an object of the present subject matter to integrate events, inventory, and performance metrics seamlessly, and detect configuration issues.

It is an object of the present subject matter to enable the aggregation of data across different systems while maintaining detailed registration connectivity history with granularity, all without encountering API limits.

It is an object of the present subject matter to provide a solution for linking the dimensions within a uc system with the correct facts in a highly dynamic environment where a service provider has limited control.

It is an object of the present subject matter to allow the linking of common monitoring data (events, metrics and current state) with model data.

These and other implementations, embodiments, processes and features of the subject matter will become more fully apparent when the following detailed description is read with the accompanying experimental details. However, both the foregoing summary of the subject matter and the following detailed description of it represent one potential implementation or embodiment and are not restrictive of the present disclosure or other alternate implementations or embodiments of the subject matter.

BRIEF DESCRIPTION OF THE DRAWINGS

A clear understanding of the key features of the subject matter summarized above may be had by reference to the appended drawings, which illustrate the method and system of the subject matter, although it will be understood that such drawings depict preferred embodiments of the subject matter and, therefore, are not to be considered as limiting its scope with regard to other embodiments which the subject matter is capable of contemplating. Accordingly:

FIG. 2B illustrates a block diagram illustrating another implementation of a collection engine of a unified communication monitoring system, in accordance with an embodiment of the present subject matter.

DETAILED DESCRIPTION OF THE INVENTION

The following is a detailed description of implementations of the present disclosure depicted in the accompanying drawings. The implementations are in such detail as to clearly communicate the disclosure. While aspects of described systems and methods for unified communications monitoring can be implemented in any number of different computing systems, environments, and/or configurations, the embodiments are described in the context of the following exemplary system(s).

The disclosed subject matter utilizes a virtual model of the Unified Communications (UC) system to mimic its functions in near real-time, specifically focusing on monitoring functions. This allows for faster data collection and aggregation across physical and logical components of the system. By maintaining this virtual model, the system can efficiently detect issues such as unregistered endpoints in device pools without exceeding API query limitations. It can determine if endpoints have failed over to backup servers or are not registering where they should be, enabling quick identification of problems.

Furthermore, the system's use of dimensional data from the model/configuration facilitates intelligence across systems. For instance, it successfully identified connectivity issues caused by a bug in the SDWAN system, correlating phone data with connectivity loss without significant delays. Another example showcases the system's ability to monitor firmware versions on remote endpoints, resulting in a significant decrease in outdated firmware instances after implementation. Overall, the system's innovative approach to utilizing virtual models for monitoring purposes leads to efficient problem detection, reduced troubleshooting time, and improved system performance.

Figure 1A:
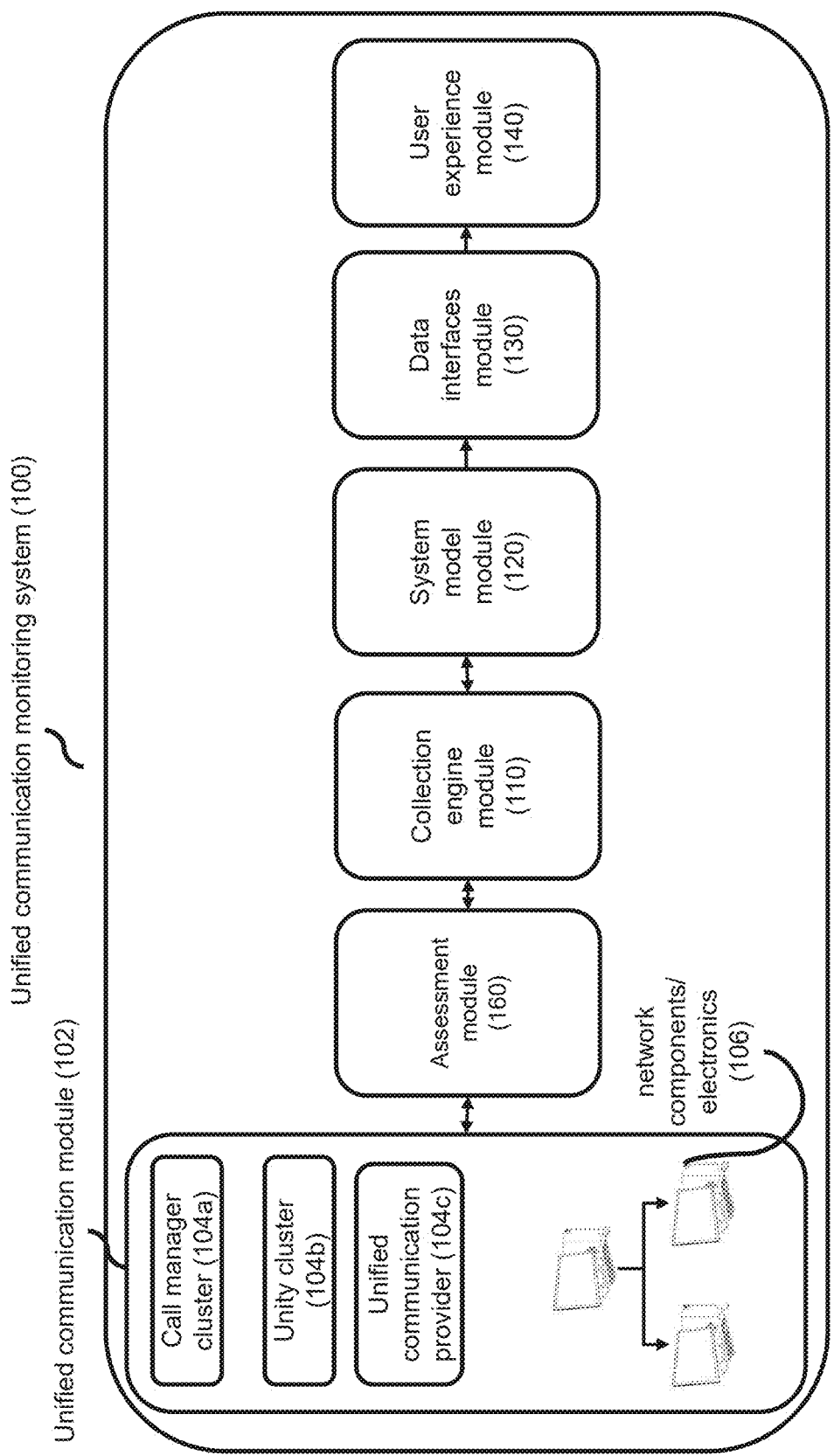
FIG. 1A illustrates a block diagram illustrating one implementation of a unified communication monitoring, in accordance with an embodiment of the present subject matter.

FIG. 1A illustrates a block diagram 100 illustrating one implementation of a unified communication monitoring, in accordance with an embodiment of the present subject matter.

In one implementation, a unified communication monitoring system 100 implements a method for unified communication monitoring as described below. FIG. 1A provides an overview of the components that are part of the unified communication monitoring system 100. The monitoring platform, databases, application servers, operating systems, and hardware can vary as this model can run on different systems, assuming they can support hosting the building blocks of the system. A unified communication module 102 is shown having a call manager cluster 104a, a unity cluster 104b, a unified communication provider 104c, and network components/electronics 106. The unified communication module 102 communicates with an assessment module 160. The assessment module is further discussed in FIG. 6. The assessment module 160 communicates with a collection engine module 110. The collection engine module 110 is further described in FIG. 2A, the collection engine module 110 communicates with a system model module 120. The system model module 120 is further described in FIG. 3A, the system model module 120 communicates with a data interfaces module 130. The data interfaces module 130 is further described in FIG. 4, the data interfaces module 130 communicates with an analytics and user experience module 140. The analytics and user experience module 140 is further described in FIG. 5.

Figure 1B:
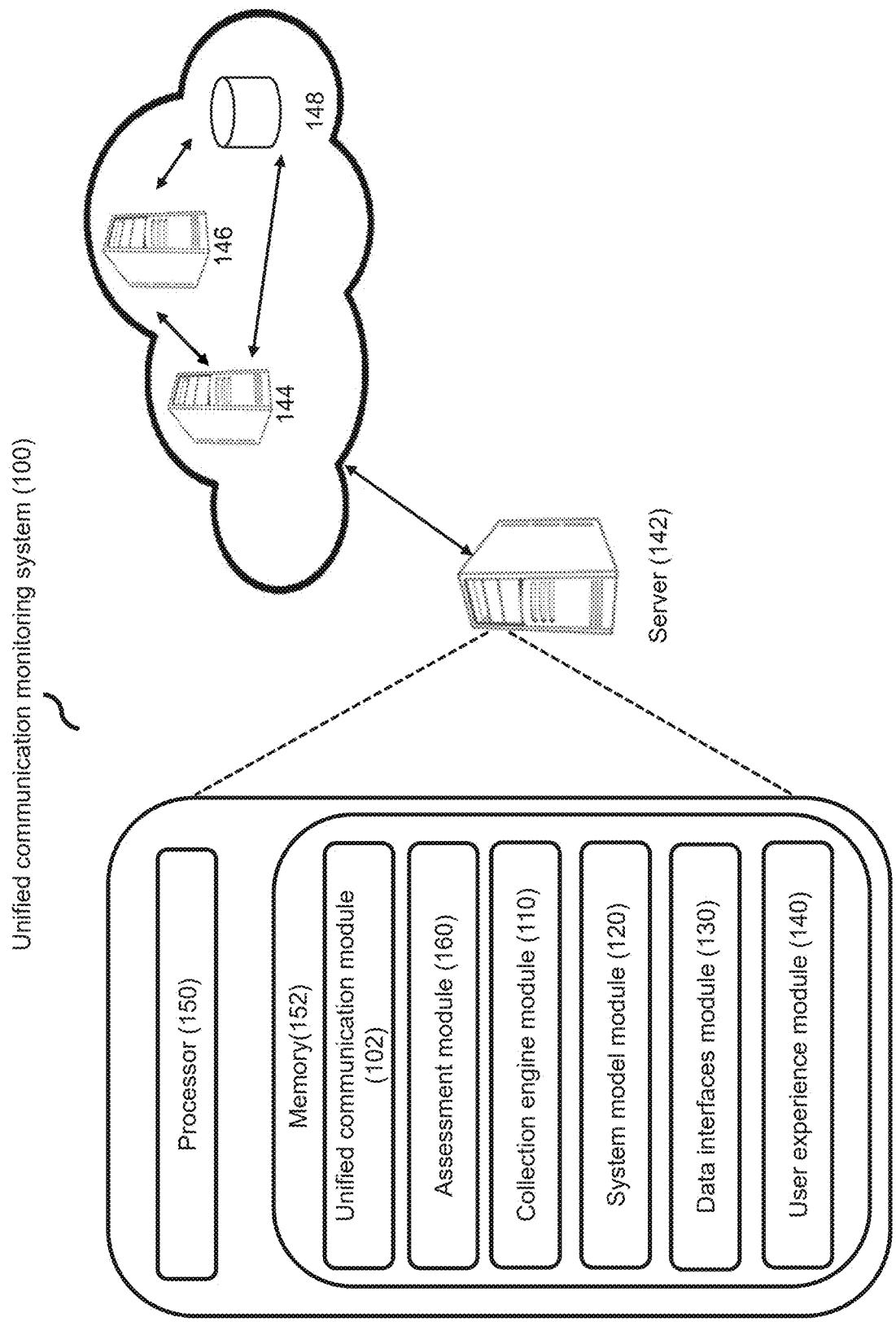
FIG. 1B illustrates a block diagram illustrating another implementation of a unified communication monitoring, in accordance with an embodiment of the present subject matter.

FIG. 1B illustrates a block diagram 100 illustrating another implementation of a unified communication monitoring, in accordance with an embodiment of the present subject matter.

In one implementation, a unified communication monitoring system 100 implements a method for unified communication monitoring on a server 142, the system 100 includes a processor(s) 150, and a memory 152 coupled to the processor(s) 150. The processor(s) 150 may be implemented as one or more microprocessors, microcomputers, microcontrollers, digital signal processors, central processing units, state machines, logic circuitries, and/or any devices that manipulate signals based on application environment migration instructions. Among other capabilities, the processor(s) 150 is configured to fetch and execute computer-readable instructions stored in the memory 152. The memory 152 can include any computer-readable medium known in the art including, for example, volatile memory (e.g., RAM), and/or non-volatile memory (e.g., EPROM, flash memory, etc.). In one embodiment, the memory 152 includes module(s) such as including a unified communication module 102, a collection engine module 110, a system model module 120, a data interfaces module 130, an analytics and user experience module 140, and other modules.

Figure 2A:
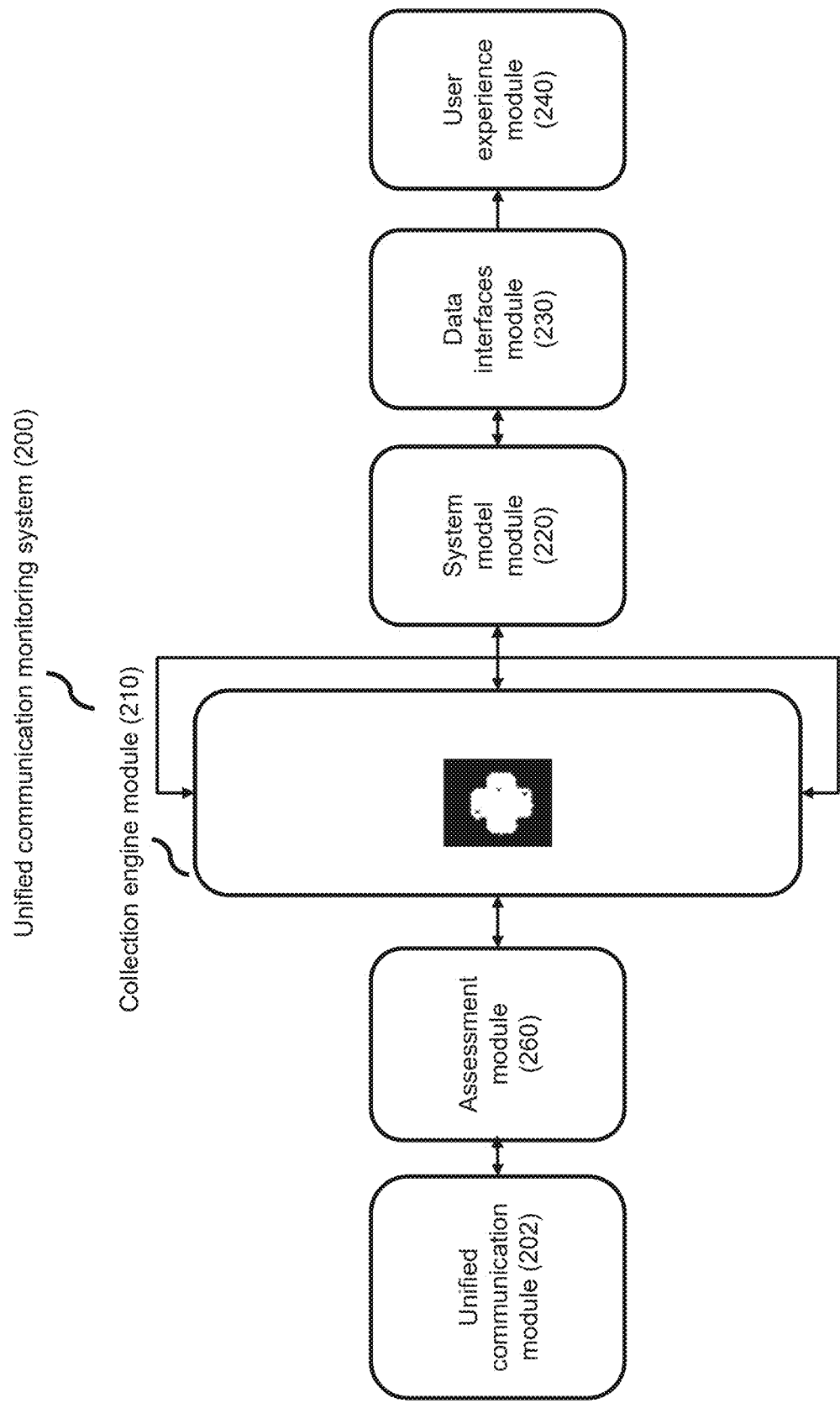
FIG. 2A illustrates a block diagram illustrating one implementation of a collection engine of a unified communication monitoring system, in accordance with an embodiment of the present subject matter.

FIG. 2A illustrates a block diagram 200 illustrating one implementation of a collection engine of a unified communication monitoring system, in accordance with an embodiment of the present subject matter.

A unified communication module 202 communicates with a collection engine module 210. The collection engine module 210 communicates with a system model module 220. The system model module 220 communicates with a data interfaces module 230. The data interfaces module 230 communicates with an analytics and user experience module 240. The unified communication module 202 is shown and has similar features of unified communication module 102, the assessment module 260 is shown and has similar features of assessment module 160, the collection engine module 210 is shown and has similar features of collection engine module 110, the system model module 220 is shown and has similar features of system model module 120, the data interfaces module 230 is shown and has similar features of data interfaces module 130, the analytics and user experience module 240 is shown and has similar features of analytics and user experience module 140, as described above.

The collection engine module 210 has collection engines that are used to collect model data, event data, and metric data. Most often data is pulled from servers and devices. However, in some cases, normally for event and Call detail records (CDR)/Call management records (CMR) data is pushed or "streamed" into the events or metrics databases via a collection engine.

FIG. 2B illustrates a block diagram 200 illustrating another implementation of a collection engine of a unified communication monitoring system, in accordance with an embodiment of the present subject matter.

In one implementation, a collection engine module 210 is further described in addition to FIG. 2A as below. The collection engine module 210 includes a unified communication appliances and cloud 250 having a call manager cluster 252, and a unity cluster 254. The collection engine module 210 includes endpoint states plugins 266, metrics plugins 258, modelling plugins 256, model intelligence plugins 268, data aggregation plugins 270, external events parser plugins 262, CDR/CMR streaming 261, availability plugins 264, and other modules and plugins. The collection engine module 210 communicates with a system model module 220.

The endpoint states plugins 266 are a set of plugins that pull data about endpoint device state. They update the model with the current state and write metrics and may send events into the events engine. These plugins allow users to determine the current state of components in the system. They use plugins such as the data aggregation plugins 270 and the external events parser plugins 262 as well as logic programmed into the interfaces to provide required data. The plugins are optimized to pull data as quickly as possible with simple queries. Each plugin will have its own algorithm for determining the state of the component based on the system being polled. In an IoT/UC world it is common to receive multiple conflicting states from different controllers. These plugins will determine the correct state and are coded after extensive testing is performed comparing the API results against real world device state.

As with any data collection effort, a reference to a component in the model must be returned with any results. For example, a query for the registration state for a phone may be sent to one controller. That controller may be down so it will fail back to send a query to the backup controller. The backup controller may respond saying that the phone is registered to the backup controller with a particular timestamp and partially registered to the tertiary controller with a different timestamp and has no records on the primary controller. In this case an algorithm is selected based on the type of component (in this case, phone) and the technology used (say Product CallManager in Second product DI). A single state is returned along with any data with that registration because in this case it is not possible or relevant to update the model, graphs and events with multiple states. The phone would show as registered to the backup controller and the data with that selected record would be used and stored. Should this algorithm not exist, then additional data would be collected from the incorrect server that is no longer collecting up to date data. The algorithms are also important since costly-to-troubleshoot complications can occur when endpoints register to geographically distant servers. Many UC systems have upper limits on network latency where the roughly additional 60 ms of additional network latency can cause instability that is difficult to troubleshoot. Additionally since the total network path and intermediate device cannot be reliably monitored, conditions such as internet peering issues and mistakes in firewall configurations will affect the system. These systems are difficult and costly to troubleshoot. Maintaining near-real time registration states compared with the expected baselines helps facilitate timely resolution of issues by less experienced engineers.

Normally some kind of controller is queried, however sometimes plugins will directly query devices as well. If the later example is used for data collection, then the plugin is coded to not bottleneck any other collection based on the lack of response of many if not all endpoints. All endpoint plugins are developed with asynchronous coding techniques. This is a requirement because the data being queried is often rate limited on the real time systems in which data is requested. If synchronous requests were used, data collection would not occur in time and if it did, the requirement for CPU resources would make the entire system economically non-viable.

In one example, the endpoint states plugins 266 includes a serviceability RIS (Realtime Information Server) registrations state plugin. The endpoint states plugins 266 takes registration data from multiple nodes across the cluster and implements a custom algorithm to determine what the registration state is, what the reason for the state is, and where the current registration is set. The registration database is loosely consistent so each server may not have a full and accurate picture. The algorithm used determines the most accurate registration data. The endpoint states plugins 266 updates the model with where the device is registered, the registration state, and other fields such as the firmware of the endpoint, the current IP address of the device, how many lines are currently configured on the phone, and other information.

Overall registration trends are managed via the components described in the data aggregation plugins 270 and the external events parser plugins 262. The endpoint states plugins 266 only deals with individual registration state, but it provides data to be used for overall registration health. The endpoint states plugins 266 adds several key features that are not available in the API or in traditional monitoring systems. These features can produce events in near real time and the states can be reported on historically to help with root cause analysis. Additional functionality includes Detection of registration to failback systems: This registered to failover state is reported per component and aggregated to device pools, clusters, and across clusters and data centres. This is very useful because registering to a failover node for any significant amount of time will often lead to an overloaded system or it may add latency to calls that will cause sporadic calling issues. The endpoint states plugins 266 also provides the addition of the expired state into the model. Expired occurs when a component has registered at some point but is currently not registered. This is important for licensing and asset/capacity management purposes. It is also important to take this into account for availability reporting. The endpoint states plugins 266 also provides the addition of the never registered state into the model. Never registered is set when it is detected that a component has never registered. This is important for licensing and asset/capacity management purposes. It is also important to take this into account for availability reporting, availability metrics for all registered components, detection of endpoints running out of date firmware and rollups of this data across clusters/data centres. Additional dimensions are included to identify hardware and software endpoints. Hardware and software endpoint identification is important because software phones typically are less available than hardware phones so availability alerts and data rollups must take this into account. A detailed history of registration activity per endpoint that can be easily searched in a timely manner for troubleshooting is also included. The endpoint states plugins 266 provides the ability to select critical endpoints for special custom alerts. For example, elevator phones or blue phones in colleges can be tagged to alert should they deregister. The endpoint states plugins 266 provides the ability to track and provide a threshold on individual and rolled up availability and endpoint availability on a per device pool, cluster, and data centre basis.

Further, the endpoint states plugins 266 includes a generic IOS/Endpoint status plugin, that is a placeholder for other plugins. For example, there is a plugin for Informacast speaker registration state that uses the rest API to get speaker status for UC connected IoT enabled loudspeakers.

The metrics plugins 258 collects performance, usage, and in some cases state data. The plugins store the metrics as time series data, they can send in events based on thresholds set, and can update model data. Data is often normalized into a universal unit as part of the collection. For example, data describing network usage is collected as Kilobytes/second, but the plugin will store it as bytes/second. These operations reduce the amount and complexity of data dictionary items that must be maintained later to support reporting and dashboarding.

The metrics plugins 258 are optimized to pull data as quickly as possible with simple queries. Advanced analytics and data rollups are not performed by these plugins so that data can be collected as quickly as possible. Model data is used by the plugin to determine what data to ask for and where to ask for it. For example, an endpoint may be able to register to several controllers. The performance monitoring plugins will look at the model to determine which node to query for the most up to date data. UC systems use a variety of clustering methods, and each plugin will understand the method and use it to get the correct and latest data. So, for example, if a Product phone running with CallManager has registered to node "a," node "a" will be queried, if it changes to node "b" then node "b" will be queried. If the plugin is trying to get data from a Product Contact centre enterprise system, then many times either node can be queried since they run in an active/active cluster. In that case the plugin will select the least busy side to ask for data until it is unavailable. The complexity of supporting all these systems is abstracted away by creating plugins that can be flexibly deployed and updated and that are specific to certain types of systems or data within the system.

The metrics plugins 258 includes a serviceability metrics plugin that uses the Product Performance Monitoring API which is part of the Serviceability API to query operating system and application statistics. This is used for data collection for Unity Clusters, CallManager Clusters, and Presence servers.

The metrics plugins 258 includes application stats plugins that is a generic placeholder for a performance statistics plugin for a UC System.

The metrics plugins 258 includes a unity REST cluster state plugin that queries nodes in a unity cluster to determine each node's health and data replication state. In addition, it checks for split brain conditions and it is used for Product Unity Clusters.

The metrics plugins 258 includes a metrics plugin that is a generic placeholder for an operating system only performance stats plugin. For example, for some servers, operating system stats such as CPU/memory usage use an API that is totally different than the application stats API. In those cases, a separate plugin would be used for collecting operating system data.

The metrics plugins 258 includes a serviceability service status plugin that uses the Service State Product API within the Serviceability API to determine which services in a cluster are started, and which services are supposed to be started. Often in UC clustered solutions it is normal to have services start and stop normally across nodes. This plugin determines which state is correct and checks the desired service states with the actual states. This plugin works for CallManager Clusters, Unity Clusters, and Presence servers.

The metrics plugins 258 includes OS services state plugins which are generic placeholder for a services state plugin. In many implementations service state is handled with a separate API with distinct logic that is different from the operating system and application APIs.

A unified communication service 272 communicates with the metrics plugins 258. In one example, the unified communication service 272 has a generic unified communication (US) internet of things (IoT) service and a generic unified communication (US) internet of things (IoT) cloud service.

The modelling plugins 256 add, remove and update components, properties of components, and relationships based on the configuration and state of the system being monitored. Once the first modelling cycle is run, from then on, only changes are sent to the model engine. The modelling plugins 256 typically share a common underlying client with the Metrics plugins described in metrics plugins 258.

The modelling plugins 256 includes AXL SQL plugin that discovers CallManager and Presence servers along with all of the model components in a CallManager cluster except for services and operating system components such as files systems, processes, and CPUs.

The modelling plugins 256 includes serviceability Perf-Mon plugin that discovers File Systems, CPUS, OS Processes, Network Interfaces, Threads, Docker Containers, and some other constructs such as Location Bandwidth Managers on CallManager and Unity Clusters.

The modelling plugins 256 includes unity rest plugin that discovers Unity Servers, the relationship between these servers and external voice mail storage systems, connected phone systems, and other application-based configurations and settings.

The modelling plugins 256 includes serviceability service status plugin that discovers services and their configuration on CallManager and Unity Clusters. Although not drawn on this diagram, it is common to have separate plugins for service discover on these types of systems.

The modelling plugins 256 includes operating system plugins that is a generic placeholder for modelers discovering operating system components in UC systems. Typically access to operating system data is handled through different APIs than those used to discover application components. These are not typically used in native cloud UC environments.

The modelling plugins 256 includes application plugins that is a generic placeholder for modelers for application and component configuration. For native cloud systems, these modelers will typically discover endpoints as well as any groupings and configurations necessary to provide reporting, metric collection, status polling, and event handling.

A unified communication service 272 communicates with the modelling plugins 256. In one example, the unified communication service 272 has a generic unified communication (US) internet of things (IoT) service and a generic unified communication (US) internet of things (IoT) cloud service.

The model intelligence plugins 268 poll the model itself to produce metrics data and events. Polling the model itself is much faster, more reliable and less resource intensive than increasing the number of complex queries done by the plugins talking to the APIs on the system. These plugins also reduce the amount of redundant API calls made to the APIs of the systems. Often polled model data is indexed in a way to allow fast searching and data rollups. Using the model allows for easier reporting and dashboarding as redundant logic does not need to be maintained in the view of the system, in reports, and in dashboards.

The model intelligence plugins 268 includes a cluster and device pool registration plugin that performs collection rollups of registration data for CallManager Clusters. The plugin counts the number of endpoints, their registration states, and their registration location per cluster and per device pool. Should the number of endpoints registered to failback CallManagers increase past a predefined threshold an event is generated to notify the engineering team that endpoints are not registered to the correct node. This is critical in that it's very possible that the path to failback nodes is physically farther away and additional network latency can cause the margin for error to shrink to the point where sporadic call quality issues can occur. If the total number of endpoints deregistration counts increases, a condition can be detected showing major connectivity loss and thus interruption of services to users. If deregistration thresholds are passed, this plugin along with an events plugin will estimate which subnets/physical locations are affected by the outage.

The model intelligence plugins 268 includes inter cluster aggregator plugin that queries the model to roll up registration data across clusters, data centres, and locations. The plugin collects overall registration data across clusters and by the location where the servers are housed. For example, the total number of endpoints registered to servers in a particular data centre are calculated. The total number of endpoints that are registered for west coast customers (regardless of what data centre the endpoints register to) can also be calculated.

The data aggregation plugins 270 take existing metric data and roll the data up across logical and physical components. Rather than querying the model, these plugins query metric data and create new metric data that is associated with container components. A simple example of this is that in a Product UC environment, The total number of current calls being handled by the system is a sum of the number of calls being handled by each CallManager. The data aggregation plugin adds these numbers together and stores the current number of calls for the cluster. This data is associated with the cluster object itself. Doing this allows the system to have thresholds for rolled up data and it also simplifies reporting and dashboarding by reducing the number of calculations. It allows for rolled up data to be viewed in the cluster view of the monitoring system as well as in dashboards and reports.

The data aggregation plugins 270 include media resources plugin that provides critical functionality by rolling up media resource usage from each type of media resource both up to media resource groups, and media resource group lists. If a call cannot get media resources, then it will fail, and that issue is very hard to confirm. Without this functionality it is difficult to perform capacity planning. For example, an ASIC on a gateway is used to change codecs on calls going across a WAN link in order to not saturate the link. The endpoint will need to locate which gateway to talk to. The device pool of the endpoint will have a media resource group list (MRGL) associated with it. The MRGL may have multiple Media Resource Groups (MRG) defined within it. Each Media Resource Group should have Transcoders to be used across one or many gateways. This plugin adds together the transcoders in use and rolls them up across groups and lists. There is a threshold on the MRGL to determine if the list is saturated. In addition, capacity planning can be performed to remove or relocate resources based on planned changes in the UC system.

The data aggregation plugins 270 includes cluster member aggregator that rolls up data across clusters per data centre. These plugins query the metrics database and roll up data across logical components in the system. For example, Cluster aggregator devices are created in the monitoring system for each data centre. The aggregator plugins query each cluster per physical location and report on the total number of active calls per data centre across all systems.

The external events parser plugins 262 are sent via Syslog or Trap or are polled from the UC system. Events are always associated with at least the system or cluster but are most often associated with one or several additional components in the model. This tagging makes it much easier for engineers to look at the history of one component or part of the system without having to perform multiple queries or use multiple interfaces. For example, an engineer can choose an endpoint in the system, see what make and model it is, look to see how long the device was registered via metric data, and at the same time see any logs associated with that device such as perhaps a log showing that the device's firmware was updated in concert with a deregistration event.

The external events parser plugins 262 includes mapping and parsing events that are mapped and transformed. Mapping categorizes events into categories and subcategories meta data based on the type of event produced. Transformation parses model data from the event and sets the tags for the components in the event. Additionally, transformation removes extraneous formatting and deduplicates similar events to make it easier for people to investigate issues by reducing the amount of the same events that must be analysed. Series of events are also set, and events may even be dropped from the system entirely. In some cases, the event transformation will consider model data. This occurs for example to suppress false positives for out-of-date firmware alerts. There are issues in some cases where an extremely new firmware may cause the system to say that the firmware is out of date when really it is actually newer than the standard. In this case the event system can look at the firmware that is supposed to be configured in the model during transformation to determine whether an event is actionable or not.

The external events parser plugins 262 includes model tagging which may occur during transformation or before. If it can be done before transformation, then the model tagging system will be used. For example, a syslog comes from an IP address, the IP address matches a particular cluster node, the node would be tagged in the event.

The external events parser plugins 262 includes threshold enhancement where thresholds are set in the metrics system however additional information may be added during event processing. For example, a custom explanation or resolution may be added referring to a KB article during event processing for a special alert for a phone located in an elevator at a customer site.

The external events parser plugins 262 includes registration subnet identified for deregistration alerts, the system will try to identify which subnets are affected. For example, if many endpoints in a device pool deregister, a threshold will be generated by the model intelligence plugins. The plugin will then look at the model to determine the last known IP address set on each endpoint and estimate which subnets are affected. This helps engineers localize the issue to specific subnets/locations and or switches/gateways at the customer premise. This helps engineers determine if the issue is caused by connectivity to or from specific data centres and helps rule in or out issues caused by firewalling or connectivity outages.

The CDR/CMR Streaming 261 have plugins that receive and process Call Detail Records (CDR) and Call Management Records (CMR). They are used to determine user experience scores as well as to provide more specific data on calling usages and paths.

The CDR/CMR Streaming 261 includes model tagging where data is received and tagged to a specific cluster, device and any components associated with the record in the model. Additionally End users are identified and tagged for the calls. Sometimes the records are also tagged with network devices and network device components within the model.

The CDR/CMR Streaming 261 includes geo-processing where data regarding geographic location of endpoints is processed and converted to a common format. This may also include selecting and enhancing any mobile network information potentially provided.

The CDR/CMR Streaming 261 includes aggregation where event data is aggregated and stored as metric data based on fields within the records. Data rollups preserve critical data without having to store the entire record sets historically.

The CDR/CMR Streaming 261 includes thresholding that is based on accumulated errors that are defined and threats. These plugins are typically fairly simple stac or time-based thresholds. Examples would be a threshold that produces an event if the average latency is >X at least 50% of the time, such as, for example, over 2 hours, then send an alert. More advanced thresholds are managed via ML/Anomaly detection models in the interfaces or within the AI/ML layer.

The availability plugins 264 has a test if connectivity is being maintained between the monitoring system and any system nodes responding to API requests. They also store latency measurements of how long the trip across the network takes as well as how long it takes the system to send a response. These plugins are critical because many times a single node outage does not break the system and monitoring must continue in this case. Many times, the data must be requested differently in the event of single nodes not responding. These plugins help the other plugins determine where to poll data in the event of a partial/server failure in the system.

The availability plugins 264 includes web ping plugin that tests to see if cluster nodes are completely unavailable. ICMP ping is typically used, however such cloud systems such as Second product do not allow inbound ICMP echo requests. In this case a client web page is opened, or a simple API call is made to determine if nodes are responding as well as storing the latency required to send, process, and receive the request. Availability data is also stored so overall availability data can be rolled up at the system or cluster level.

The availability plugins 264 includes ICMP ping plugin that tests by sending ICMP echo requests and receiving ICMP echo replies. Events are sent in the event of response failures and the latency measured for the round-trip requests and replies are stored as metrics. Availability data is also stored so overall availability data can be rolled up at the system or cluster level.

Figure 3A:
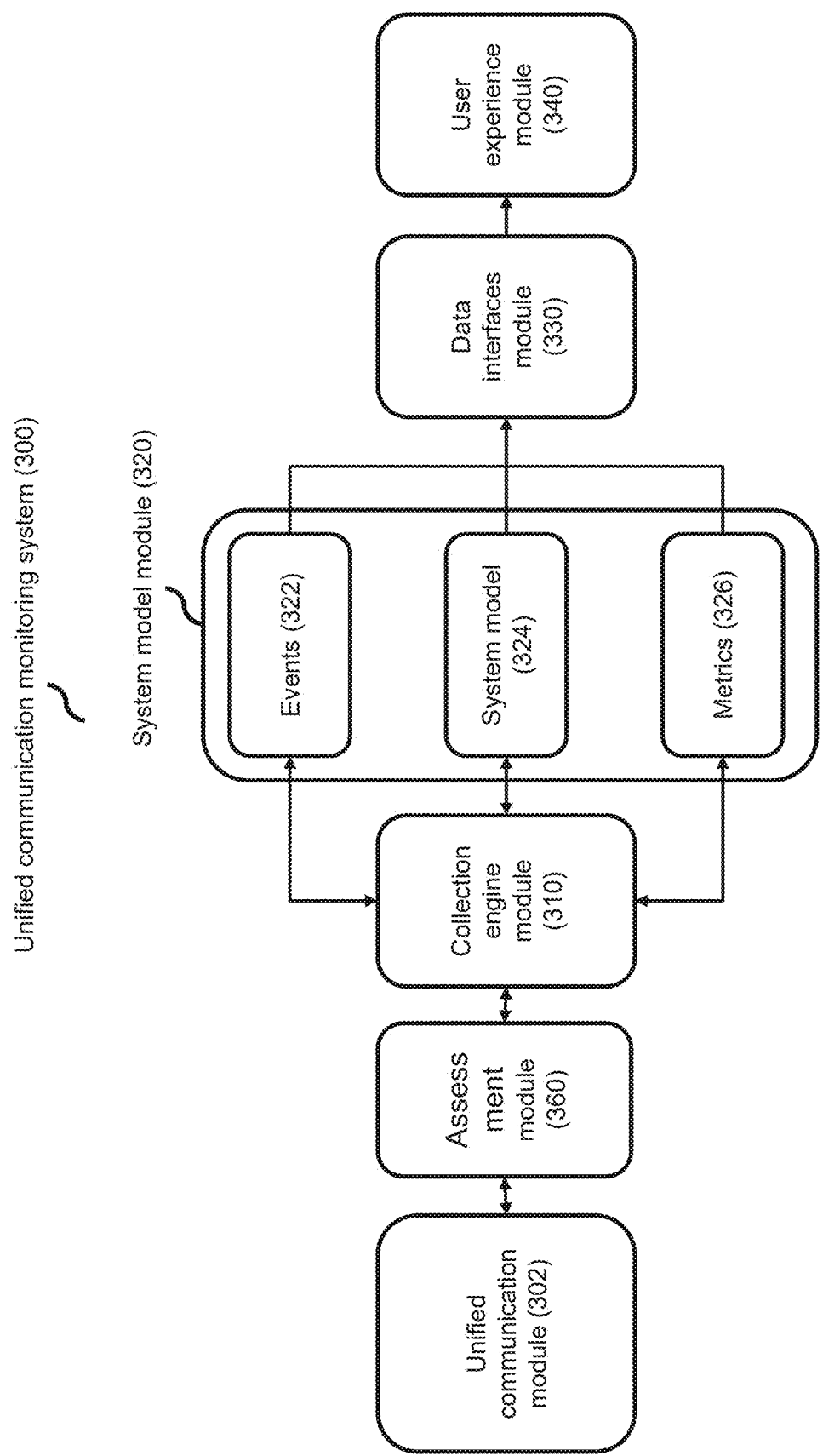
FIG. 3A illustrates a block diagram illustrating one implementation of a system model of a unified communication monitoring system, in accordance with an embodiment of the present subject matter.

FIG. 3A illustrates a block diagram 300 illustrating one implementation of a system model of a unified communication monitoring system, in accordance with an embodiment of the present subject matter.

A unified communication module 302 communicates with a collection engine module 310. The collection engine module 310 communicates with a system model module 320. The system model module 320 communicates with a data interfaces module 330. The system model module 320 includes events 322, a system model 324, and metrics 326. The data interfaces module 330 communicates with an analytics and user experience module 340. The unified communication module 302 is shown and has similar features of unified communication modules 102, 202, the assessment module 360 is shown and has similar features of assessment modules 160, 260, the collection engine module 310 is shown and has similar features of collection engine modules 110, 210, the system model module 320 is shown and has similar features of system model modules 120, 220, the data interfaces module 330 is shown and has similar features of data interfaces modules 130, 230, the analytics and user experience module 340 is shown and has similar features of analytics and user experience modules 140, 240, as described above.

Figure 3B:
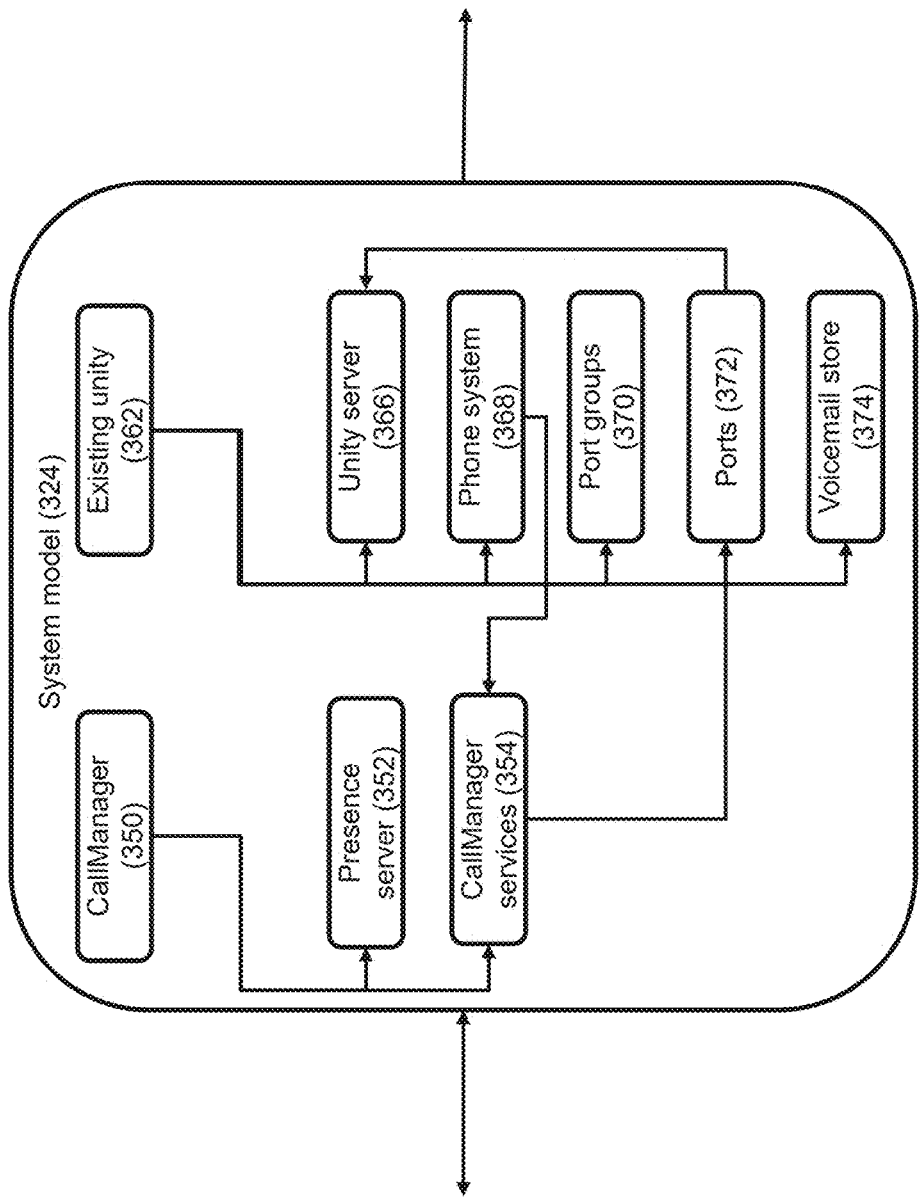
FIG. 3B illustrates a block diagram illustrating another implementation of a system model of a unified communication monitoring system, in accordance with an embodiment of the present subject matter.

FIG. 3B illustrates a block diagram 300 illustrating another implementation of a system model of a unified communication monitoring system, in accordance with an embodiment of the present subject matter.

In one implementation, figure describes a unified communication system model 324 and data stores used in the system. The more important part is the system model. Model data is collected representing the current state as well as the configuration of the system. Some of this is collected periodically and some is updated in the virtual model in near real time. Data is not collected for the events or metrics data stores without reference to some entity in the model database. The model reflects how things are operating and how they are currently configured. Whenever possible it follows the systems architecture.

For example, in Product UC, endpoints are added to device pools. Endpoints are things that make calls. They are a database entry that represents an (often physical) device and the state of such device as far as the servers can determine. Device Pools are logical groupings of endpoints. When device pools are deleted, the endpoints are NOT deleted so the relationships are defined as follows:

CallManager Cluster 1→MC (many containing) Endpoints

CallManager Cluster 1→MC Device Pools

Device Pools 1→M (Many non-containing) Endpoints

Each node in the cluster has operating system related subcomponents in the system model 324. These include CPUs (and a Total CPU for overall CPU), file systems, processes, threads, and services. Metric data is associated with each individual model component. These components cannot exist without an existing unity 362, CallManager 350, or presence server 352 cluster node. The CallManager cluster 350 communicates with the presence server 352 and a CallManager services 354. The unity cluster 360 communicates with a unity server 366, a phone system 368, port groups 370, ports 372, and a voicemail store 374. The phone system 368 integrates with the CallManager services 354. The CallManager services 354 transmits via the ports 372. The ports 372 runs on the unity server 366. The model data of these components is extremely important to track for capacity planning purposes. For example, when designing and deploying a failover strategy, it is important to make sure that each node handling endpoint registration has the same number of CPUs so that each node can handle the full load during server/network maintenance or temporary outages. These components may be filtered from the model in order to save processing time and storage during normal operation. For example, monitoring individual threads is not necessary in most cases so these are not modelled by default.

Figure 3C:
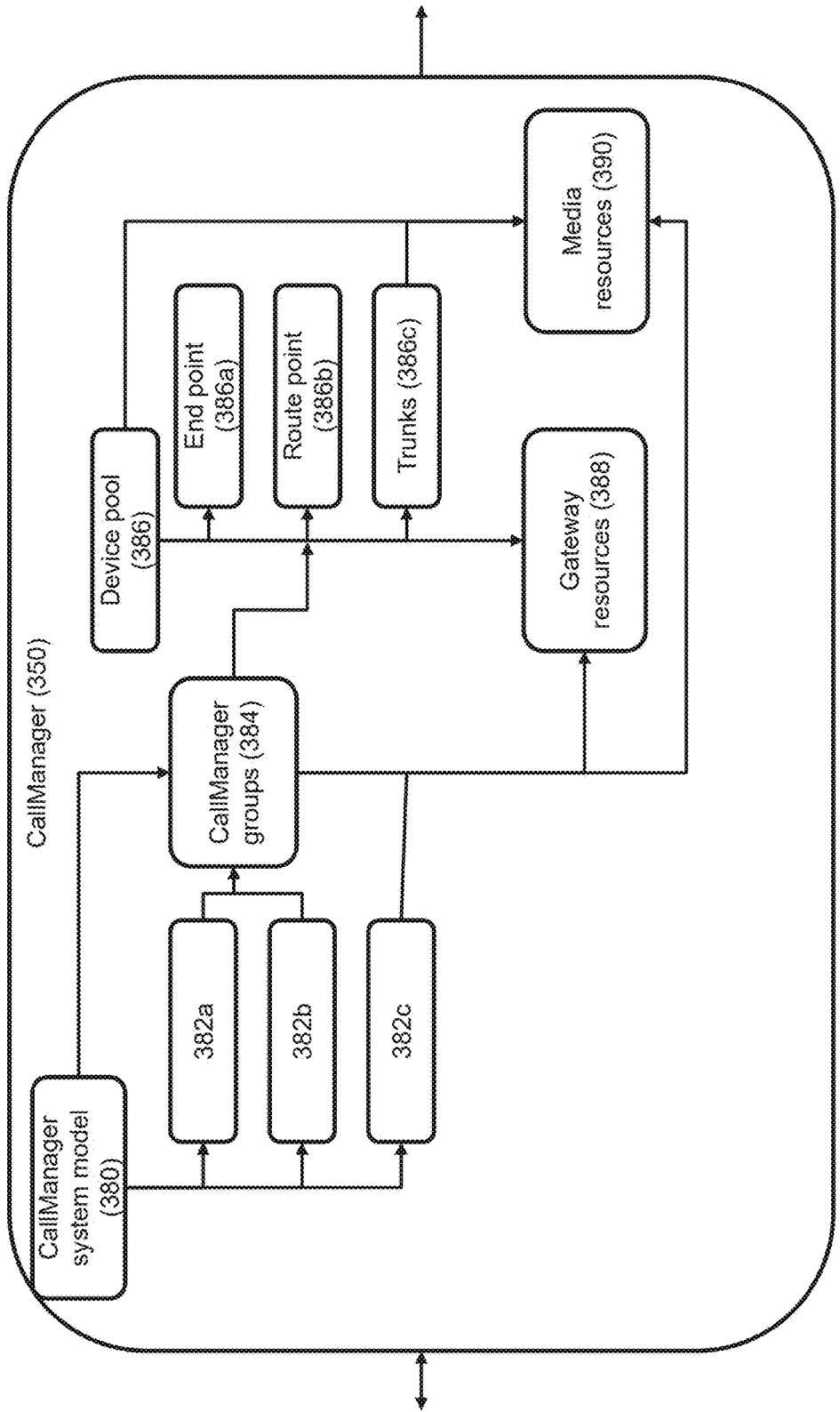
FIG. 3C illustrates a block diagram illustrating another implementation of a system model of a unified communication monitoring system, in accordance with an embodiment of the present subject matter.

FIG. 3C illustrates a block diagram 300 illustrating another implementation of a system model of a unified communication monitoring system, in accordance with an embodiment of the present subject matter.

In certain implementations, the CallManager model system 350 is a model that is specific to a Product UC System using CallManager in On-premises, Hosted Collaboration Services (HCS), or within the Second product Cloud. Components and relationships more relevant for monitoring are created. The model is a partially complete model of the complete system. It is partial because not all the components and application logic must be created and maintained to perform monitoring activities. For example, the model is built so that a media resource list can be assigned via a device pool or directly via an endpoint. There is a method that can be called on endpoints to determine which media resource list to use. The logic is that locally assigned media resource lists are used if assigned otherwise they are assigned via device pool. The method is implemented because it is important for the services model to determine the health of the system. However, the virtual model of the system cannot actually process requests for media resources, like a real CallManager can.

Additional components are added as required as new versions add features. Model components can be filtered from being added to the model to account for bugs and to increase or decrease the amount of data collected. Individual stats per process for example can be added to Second product systems should it be necessary. However, the default per process monitoring is disabled for Second product since the Product is responsible for troubleshooting those types of issues. However, in that case, overall memory thresholds are still enabled to allow engineers to quickly diagnose the root cause of the issue and hand it to the Product for detailed root cause. In the following sections, some key aspects of the model are documented.

A CallManager system model 380 having CallManager groups 384 (a group of CallManagers) are created and added to a cluster. CallManager groups 384 are created, and each group has an ordered priority list of CallManagers assigned to the group. Device pools are created, and each device pool is assigned to a CallManager Group. Components that register such as endpoints, SIP Trunks, Media resources, MGCP gateway resources use device pools and group constructs to determine where they register. This prevents, for example, endpoints located on the west coast from registering to nodes on the east coast unless there is a failure condition. These model constructs are collected and stored in the model of the monitoring system because the plugins must determine which node to poll for registration status. Should the node be unavailable, the best possible node is selected to continue to collect data. The plugins determine if endpoints, trunks, gateways, and other components are registered to the highest priority CallManager node in the group. If not, the registration is determined to be in failback mode. If registrations change, then you must poll the node that is hosting the registration for metric data. Data can be rolled up to device pools to help engineers quickly identify the scope of outages.

A CallManager node from the CallManager 384 and components register to an end point 386*a* of the CallManager node. The registration states are registered, unregistered, partially registered, unknown, and rejected. If a component is registered or partially registered, then the relationship between the component and the node is set in the model. Components within the UC system use the connection to a CallManager node for various functions such as call setup and tear down via SIP, and determining the location of media resources 390.

Registration can change if a configuration change is made or if there is a communication interruption caused by connectivity or server faults. When this occurs, the component will try to re-establish a registration with one of the nodes. Often this creates multiple registration entries on multiple nodes with various registration states and time stamps. To complicate matters, the registration data can age out of the Registration database. That will occur usually if a component has been unregistered for more than 48 hours or has never registered. This situation requires special actions although it is very common. For example, this will almost certainly occur over a long weekend when a soft phone will not commonly be used by many users.

These states have been enhanced in the model of this tool to include an expired and a never registered state. In addition, detection has been added for trunks registering to a failback node. The modelers store where the component should be registered in normal conditions. The Endpoint State poller updates the current state of these registration. The model is updated to reflect the registration state and location (node). Although this example is specific to Product CallManager environments, most other UC/IoT systems use similar mechanics that require similar data models and relationships to be maintained. A device pool 386 has the end point 386*a*, a route point 386*b*, and trunks 386*c*.

The CallManager system model 350 has the trunks 386*c*. In one examples, the trunks 386*c* come in two varieties, H.323 and SIP. Although the same API and states are returned by the registration API, the returned states must be translated because trunk states are different from registration states. Trunks can be In Service, Out of Service, or In Partial Service. The registration records for trunks can also expire after roughly two days of being out of service. These states have been enhanced in the model of this tool to include an expired and a never registered state. In addition, detection has been added for trunks registering to a failback node.

The CallManager system model 350 has MCGP gateway resources 388 where some components run in the Media Gateway Control Protocol (MGCP) mode. Typically, gateways will run in this mode for on-customer premise systems. When a gateway is configured in this mode, monitoring is affected in two way. First, statistics and states about the gateway and its UC components are available via CallManager APIs. Second, the gateways themselves when monitored as separate devices may not report on these statistics and states.

For example, A gateway in MGCP mode may have an analog phone line that is plugged into a fax machine. The registration status, usage stats and the status of the connection to an outside telephone company would be available on the CallManager. If the gateway was in SIP mode, the registration status would be available via the CallManager, but any physical port status would only be available by querying the gateway directly.

Figure 3D:
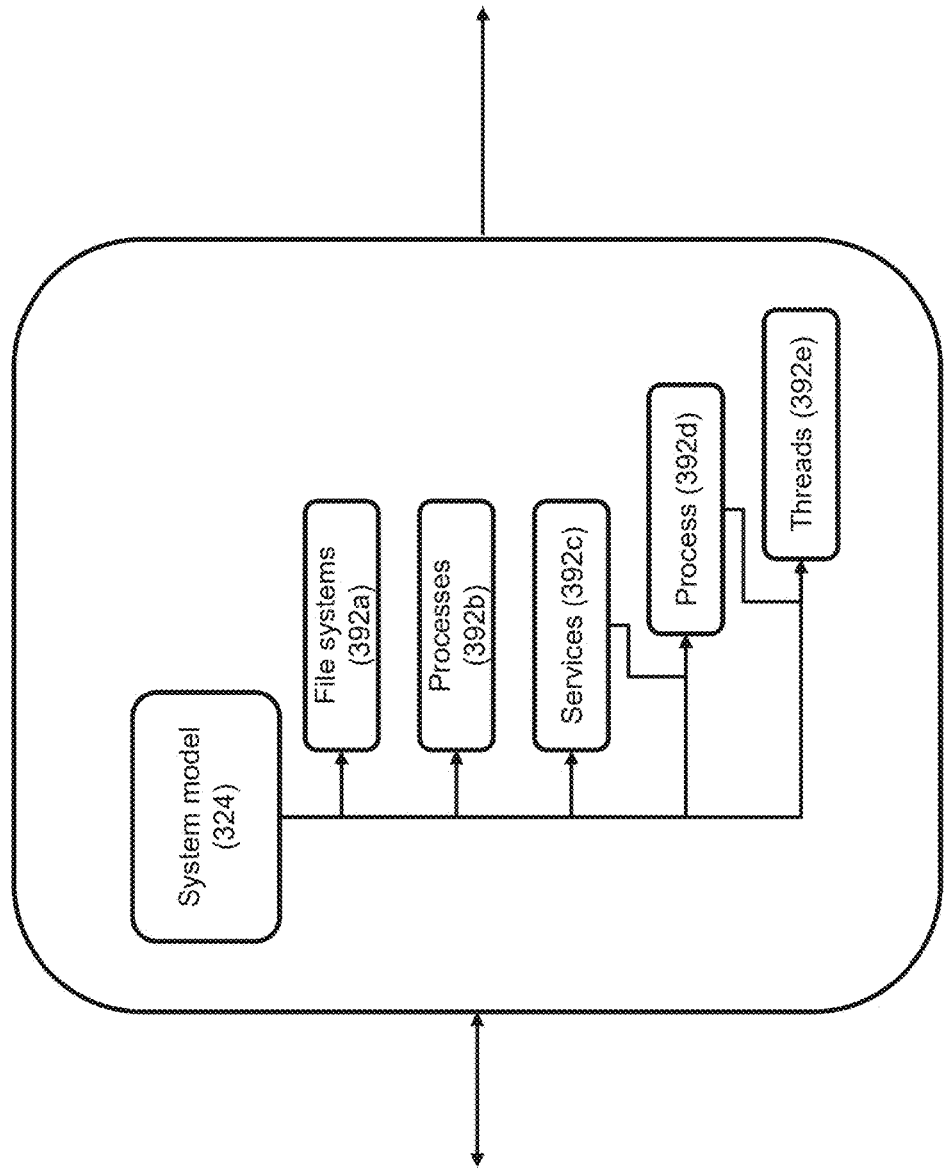
FIG. 3D illustrates a block diagram illustrating another implementation of another system model of a unified communication monitoring system, in accordance with an embodiment of the present subject matter.

FIG. 3D illustrates a block diagram 300 illustrating another implementation of another system model of a unified communication monitoring system, in accordance with an embodiment of the present subject matter.

In one implementation, UC server operating system components has a UC server (CallManager, Unity, Presence) 324. Each node in the cluster has operating system related subcomponents in the model. These include CPUs (and a Total CPU for overall CPU), file systems 392a, processes 392b, services 392c, leading to process 392d and threads 392e. The metric data is associated with each individual model component. These components cannot exist without an existing Unity, CallManager, or Presence Server cluster node. The model data of these components is extremely important to track for capacity planning purposes. For example, when designing and deploying a failover strategy, it is important to make sure that each node handling endpoint registrations has the same number of CPUs so that each node can handle the full load during server/network maintenance or temporary outages. These components may be filtered from the model in order to save processing time and storage during normal operation. For example, monitoring individual threads is not necessary in most cases so these are not modelled by default.

Figure 4:
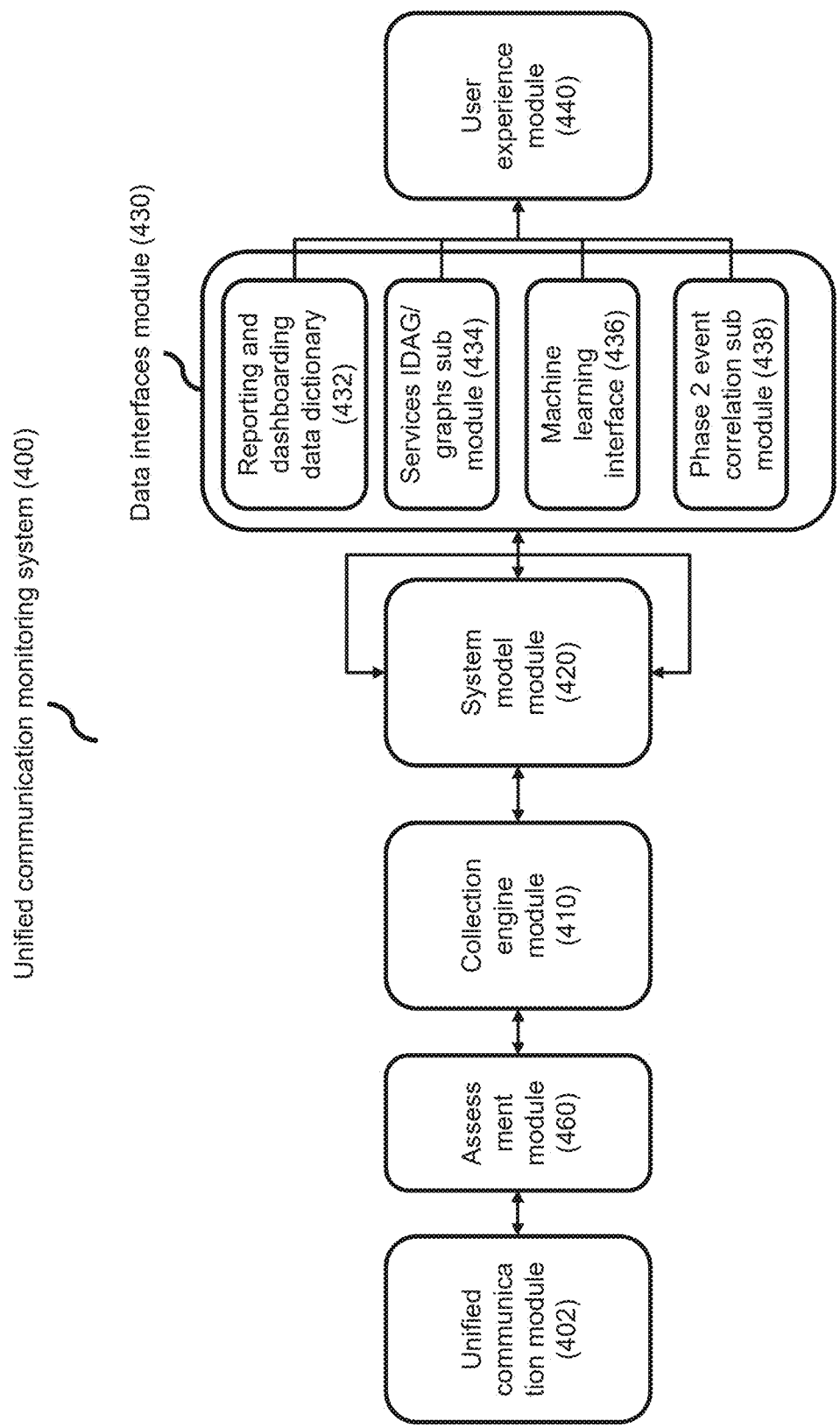
FIG. 4 illustrates a block diagram illustrating one implementation of data interfaces of a unified communication monitoring system, in accordance with an embodiment of the present subject matter.

FIG. 4 illustrates a block diagram 400 illustrating one implementation of data interfaces of a unified communication monitoring system, in accordance with an embodiment of the present subject matter.

A unified communication module 402 communicates with a collection engine module 410. The collection engine module 410 communicates with a system model module 420. The system model module 420 communicates with a data interfaces module 430. The data interfaces module 430 communicates with an analytics and user experience module 440. The unified communication module 402 is shown and has similar features of unified communication modules 102, 202, 302, the assessment module 460 is shown and has similar features of assessment modules 160, 260, 360, the collection engine module 410 is shown and has similar features of collection engine modules 110, 210, 310, the system model module 420 is shown and has similar features of system model modules 120, 220, 320, the data interfaces module 430 is shown and has similar features of data interfaces modules 130, 230, 330, the analytics and user experience module 440 is shown and has similar features of analytics and user experience modules 140, 240, 340, as described above.

The data interfaces module 430 has sub modules including a reporting and dashboarding data dictionary 432, a services IDAG/graphs sub module 434, a machine learning interface 436, a phase 2 event correlation sub module 438, and other sub modules. The submodules communicate with respective sub modules of the analytics and user experience module 440.

Data may be requested and presented for external interface (end users or output to further automatons) via several modalities. These modalities include-people logging into the monitoring GUI to explore data, the viewing of reports/dashboards, the viewing of an overlay services diagram showing the status of services across the system (or the creation of events based on these rules), the viewing of root cause based on deep learning models, or other more basic ML predictive model (or events created from such models).

In one example, in many cases there are software interfaces defined with business and technical logic to abstract away detail and to provide flexible and rapidly deployed methods for extracting data. These software interfaces never change the base model but only enhance it. The monitoring "impact services" interface defines the way that the model is read in order to create a directed cyclical graph of services. Defining services for everything a CallManager can do, or every failure condition would be an exercise in futility. However, there are many cases where it is very useful to add logic defining the health of the system. For example, it is possible to define two SLIs for the TFTP service within a CallManager. They are as follows: 1(a) if all ENABLED TFTP services are broken, the service is "DOWN", 1(b) if any ENABLED TFTP service is broken but there is at least one running the service is "AT RISK", and 2(a) If a certain percentage of endpoints are running out of date firmware, the service is "AT RISK". In the model, CallManager Cluster 1→MC CallManager, CallManager 1-MC service. A service interface may be created called getClusterTFTPServiceHealth. It would walk through the model looking for the TFTP services that are enabled then check the states. If there are no services down, it may return "SERVICE AVAILABILITY OK". if all enabled services are down, it may return "SERVICE AVAILABILITY DOWN", if some are up and some are down it may return "SERVICE AVAILABILITY AT RISK". Another interface may be defined called something like getClusterEndpointFirmwareCompliance. It may return "SERVICE AT RISK" if >10% of the endpoints do not have the current firmware. it determines this by walking through the model and comparing the expected and current firmware version. These interfaces are critical because without them the system would need to implement logic across dashboarding, reporting, then the services subsystem, each would need duplicated logic. It uses the model but does not change it. The models don't tend to change nearly as much as the interfaces do as a practical matter. Changing the model is complex and requires updating collection engines and the definition of the model schema. Changing interfaces is simple, much faster, and relatively risk free.

In another example, certain metrics are flagged to undergo AI/ML anomaly detection. Some metrics cannot be easily set with thresholds using simple algorithms. These normally include things such as active calls on a UC system. These metrics typically have multiple overlapping seasonality, such as work-day seasonality, weekend, holidays, and in some cases, there are overlapping year-long seasonality (ex: retailers and the holiday, health care exchange and open enrolment). There are even unexpected forms of seasonality such as in the case of certain school vacation weeks throughout the school year in certain states or even towns or counties. The detection algorithm(s) look for unexpected anomalous which in turn can be sent via events and eventually tickets for review or just browsed in the events or presented in dashboards. These thresholds become more accurate over time and typically take a minimum of a one month learning period before activating. Different AI/ML implementations can be swapped out as necessary as they are not tightly bound to collection. In one example, an exchange was alerted on anomalous behaviour in call volume and on certain error rates. This was not initially used as a primary indicator of an unhealthy situation however it was very helpful when paired with static thresholds in order to determine that certain drops in call volume were not normal and were most likely linked to some subtle errors in the system.

In another example, if a customer is struggling with a major connectivity related bug that is not related to the performance of their unified communications system. The customer purchased software that measures user experience however, it could not distinguish outages caused by the bug vs outages caused by an agent shutting down their equipment inappropriately. Although the near-real time data and events are available to them, they need to share the results with non-technical managers. The reporting interface pulls model and metric data that queries both the UC endpoint availability as well as other non-trivial data indicating that outages are occurring due to technical issues via the customers cloud Software Defined WAN (SDWAN) cloud vendor. In this case a report is generated and sent to the customer on a daily basis that indicated the time periods in which agents are unavailable due to the SDWAN bug.

Figure 5:
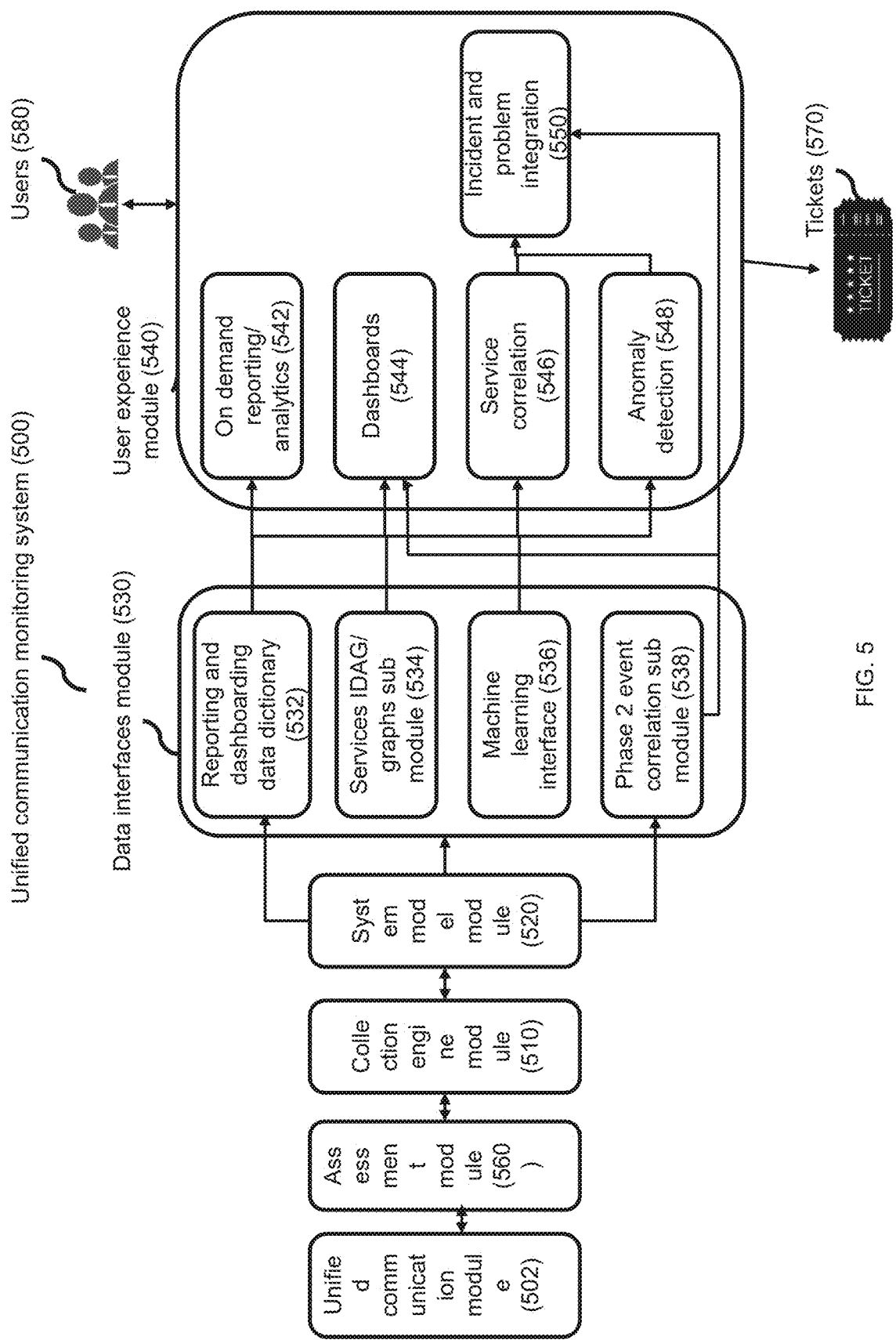
FIG. 5 illustrates a block diagram illustrating another implementation of an analytics and user experience of a unified communication monitoring system, in accordance with an embodiment of the present subject matter.

FIG. 5 illustrates a block diagram 500 illustrating another implementation of an analytics and user experience of a unified communication monitoring system, in accordance with an embodiment of the present subject matter.

A unified communication module 502 communicates with a collection engine module 510. The collection engine module 510 communicates with a system model module 520. The system model module 520 communicates with a data interfaces module 530. The data interfaces module 530 communicates with an analytics and user experience module 540. The data interfaces module 530 has sub modules including a reporting and dashboarding data dictionary 532, a services IDAG/graphs sub module 534, a machine learning interface 536, a phase 2 event correlation sub module 538, and other sub modules. The unified communication module 502 is shown and has similar features of unified communication modules 102, 202, 302, 402, the assessment module 560 is shown and has similar features of assessment modules 160, 260, 360, 460, the collection engine module 310 is shown and has similar features of collection engine modules 110, 210, 310, 410, the system model module 520 is shown and has similar features of system model modules 120, 220, 320, 420, the data interfaces module 530 is shown and has similar features of data interfaces modules 130, 230, 330, 430, the analytics and user experience module 540 is shown and has similar features of analytics and user experience modules 140, 240, 340, 440, as described above.

The analytics and user experience module 540 has sub modules including on demand reporting/analytics 542, dashboards 544, service correlation 546, anomaly detection 548, and incident and problem integration 550. The data interfaces module 530 submodules communicate with respective sub modules of the analytics and user experience module 440. The reporting and dashboarding data dictionary 532 sends information to the demand reporting/analytics 542, and the dashboards 544. The services IDAG/graphs sub module 534 works with the service correlation 546, further sending data to the incident and problem integration 550. The machine learning interface 536 sends data to the anomaly detection 548 that further feeds information to the incident and problem integration 550. The phase 2 event correlation sub module 538 send information to the dashboards 544 and the incident and problem integration 550. The users 580 accesses the analytics and user experience module 540 to monitor the entire unified communication system and generate tickets 570 as per the status or monitoring reports.

The system can pull data from Product UC or from other on premise of UC cloud providers. Supporting other providers mostly involves wiring plugins for each system to be added. Additionally, data from networking equipment is joined into the system to provide additional events, performance data, and analytics.

Figure 6:
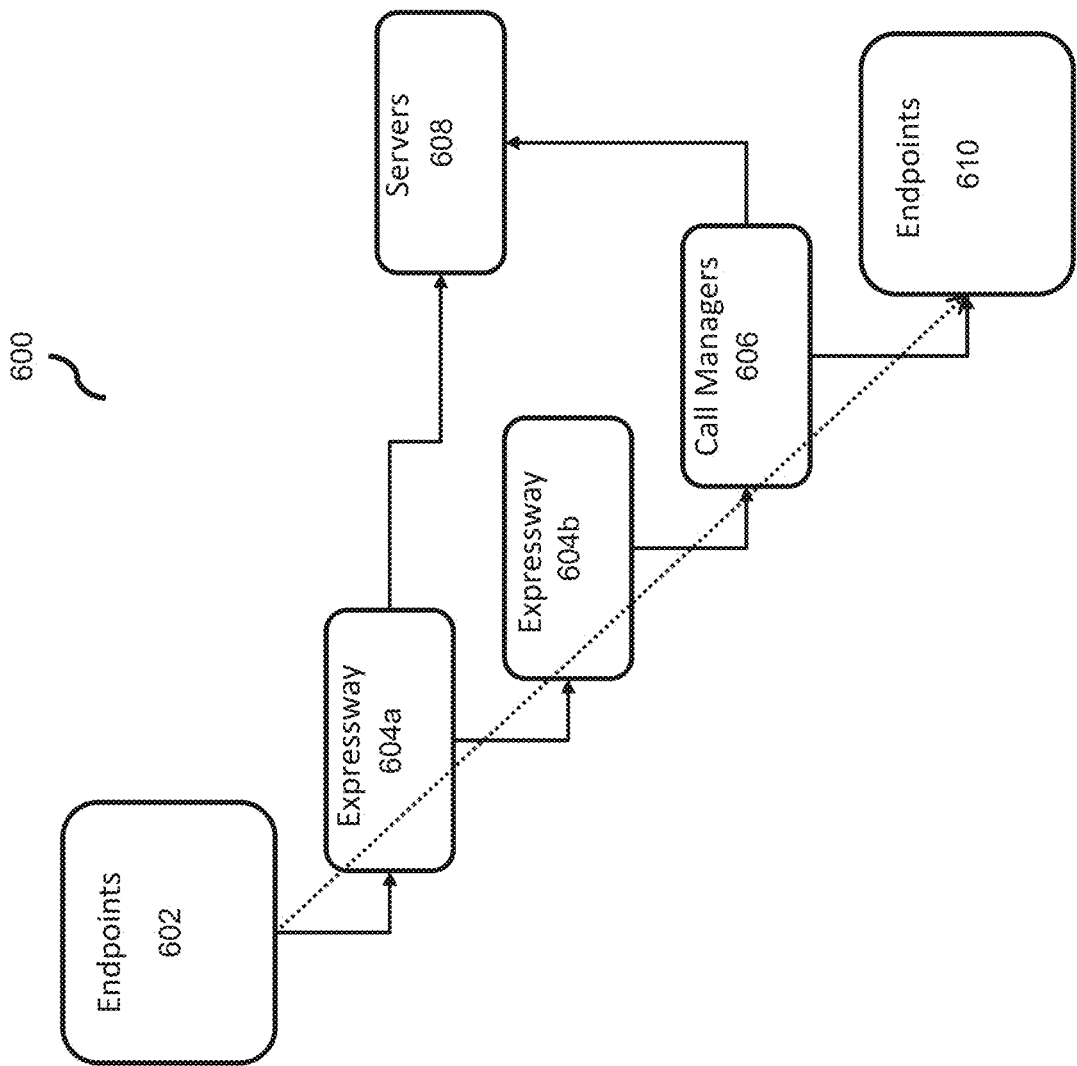
FIG. 6 illustrates a block diagram illustrating one implementation of a unified communication monitoring system, in accordance with an embodiment of the present subject matter.

FIG. 6 illustrates a block diagram 600 illustrating one implementation of a unified communication monitoring system, in accordance with an embodiment of the present subject matter.

The block diagram shows endpoints 602 with an expressway 604a while using a communication and security protocol, further with an expressway 604b and alike using a communication and security protocol, that further connects to Call Managers 606. Both the expressway 604a and the Call Managers 606 are linked to Servers 608.

The clusters like endpoints and expressways are connected behind communication and security protocol such as a firewall. Each of the expressways are connected in a load balanced manner, but do not communicate with each other. The Call Managers 606 stop toll fraud. DDOS firewall is another layer of protection that also provides insight into a DDOS attack. These components are time sensitive to avoid any connectivity issues. The Expressways are used for several things but in practice are used to allow endpoints 602 on the internet to make calls to endpoints 610 on internal networks as well as make calls out to the PSTN. The software is connected into the Call Manager and Perimeta models.

Figure 7:
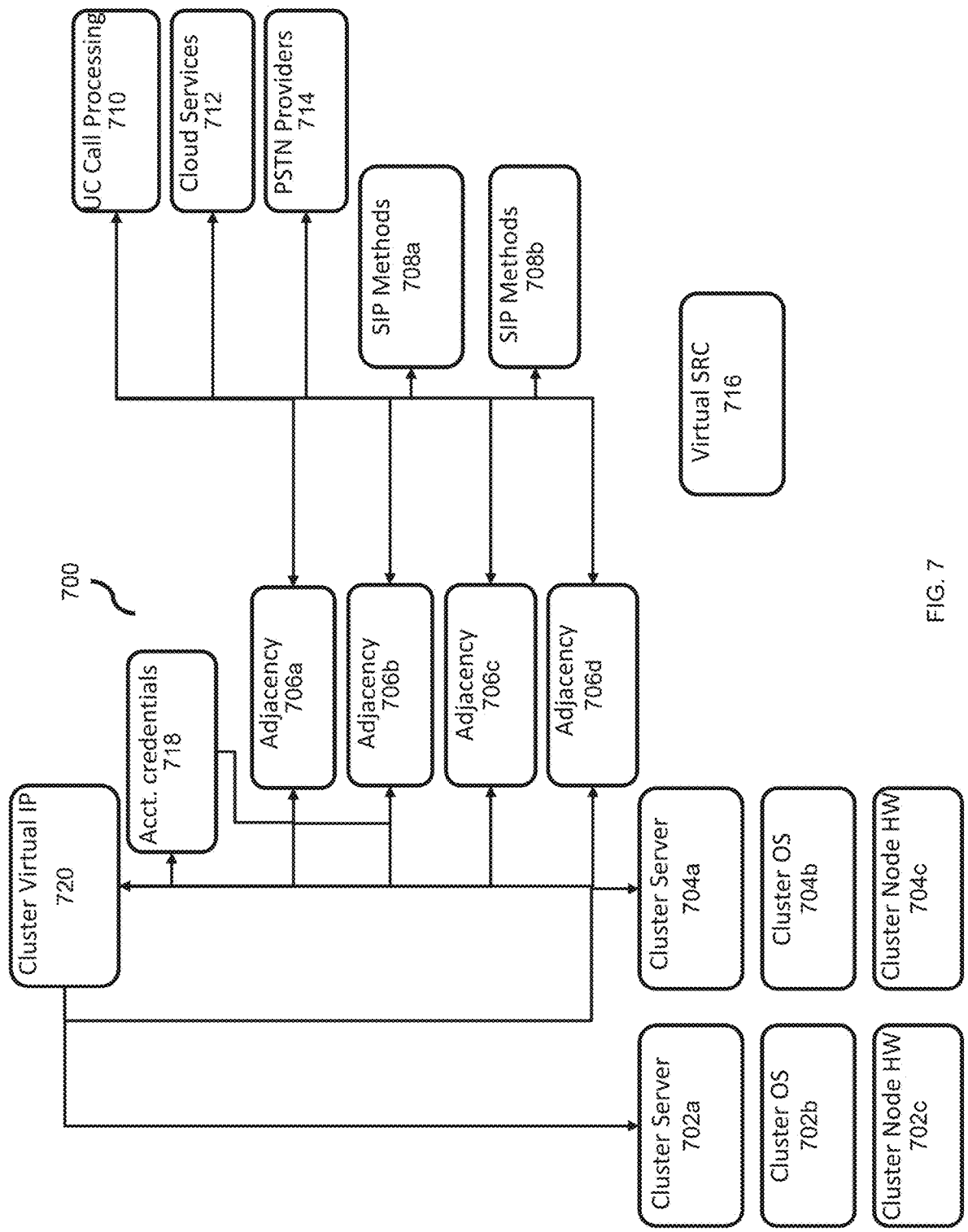
FIG. 7 illustrates a block diagram illustrating one implementation of a unified communication monitoring system, in accordance with an embodiment of the present subject matter.

FIG. 7 illustrates a block diagram 700 illustrating one implementation of a unified communication monitoring system, in accordance with an embodiment of the present subject matter.

The diagram shows a Perimeta Cluster Virtual IP 720 linked to Perimeta Cluster Servers like a Perimeta Cluster Server 702a, linked to Perimeta Cluster OS components 702b and Perimeta Cluster Node Hardware 702c and a Perimeta Cluster Server 704a, linked to Perimeta Cluster OS components 704b and Perimeta Cluster Node Hardware 704c. Also, Perimeta Cluster Virtual IP 720 connects to Adjacency 706a, 706b, 706c, 706d, and the like. In one example, the Adjacency 706a, 706b are accessed using an account credentials 718 and has access to SIP methods 708a, 708b. The Adjacency 706a, 706b provides access to UC call processing 710 such as call managers, Avaya Systems, other Perimeta clusters, on-premise contact centers, cloud contact centers, and other UCAS providers such as Microsoft Teams. The Adjacency 706c provides access to Cloud services 712 and the Adjacency 706d provides access to Upstream PSTN providers 714. A Customer Virtual SRC 716 exists in monitoring mode.

The Perimeta SBCs (session border controller) are an application running on a cluster of servers that route SIP and RTP voice traffic between VoIP (Voice over IP) enabled controllers and endpoints, between these systems and other carriers, and between clusters or Perimetas. Generally a VoIP system will form an adjacency with a Perimeta and the SBC will route calls to the called party. . . . The solution adds the ability to create a "virtual" SBC which allows customers to see their data on multi-tenant Perimeta clusters. It can also be used to create virtual SBCs for for inbound traffic to call processing servers and or outbound traffic to upstream PSTN or cloud providers. This abstracts away much of the details of hardware, OS components, etc. The virtual device technology can also be adapted to any multi-tenant hardware or software systems that are supported as part of this solution. For example, a customer could be given access to a "Virual Router or Switch" that only shows components that are dedicated to a specific customers traffic. . . . The data is collected by polling the monitoring system data itself where it is aggregated out of a multi-tenant devices and stored on the "virtual" objects.

Figure 8:
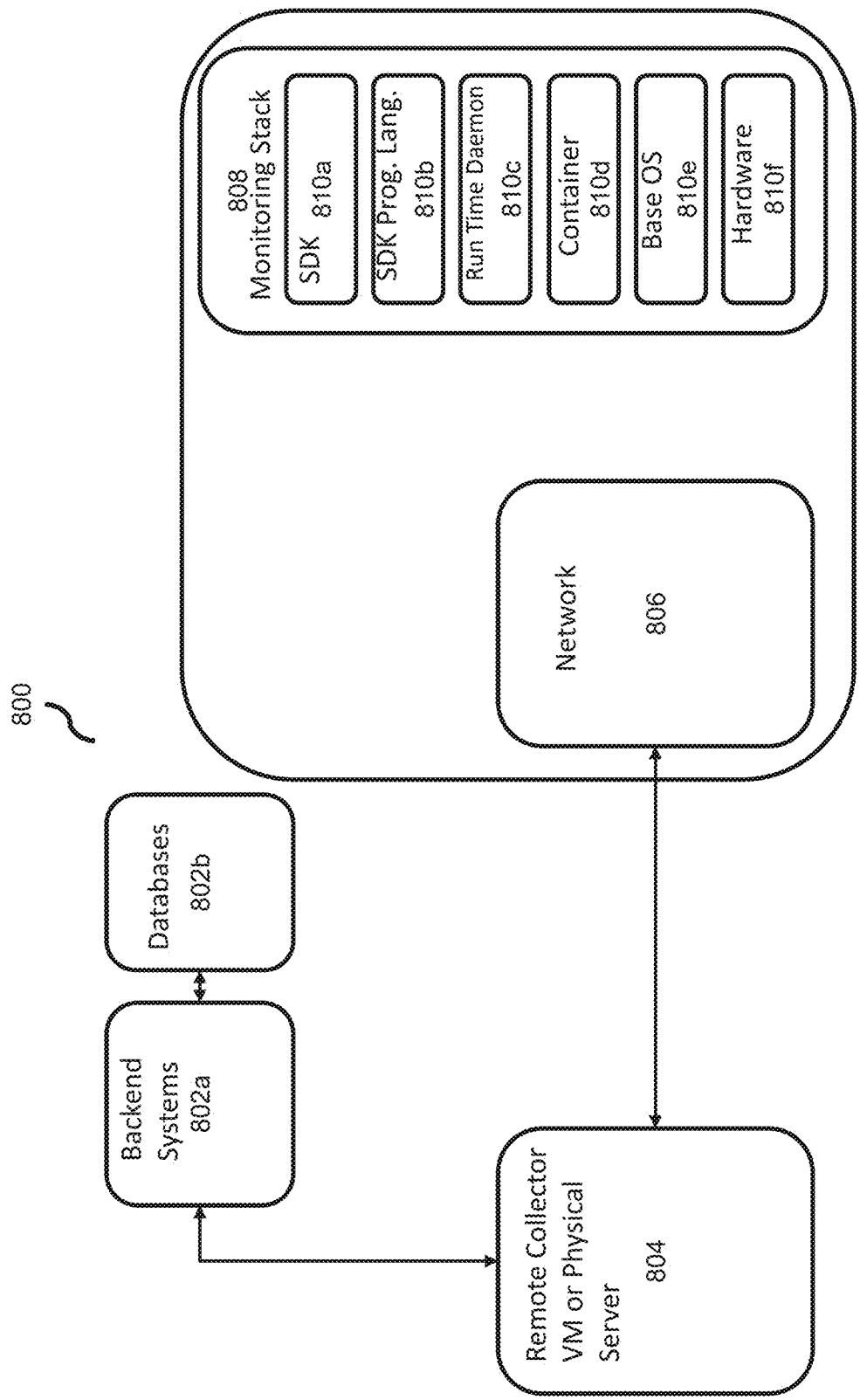
FIG. 8 illustrates a block diagram illustrating one implementation of a unified communication monitoring system, in accordance with an embodiment of the present subject matter.

FIG. 8 illustrates a block diagram 800 illustrating one implementation of a unified communication monitoring system, in accordance with an embodiment of the present subject matter.

The implementation shows backend systems and databases 802*a*, 802*b* communicates using encrypted service mesh with a remote collector VM or physical server 804 having cached metrics, events, model data, also container instances modelling, polling, event stream receivers and associated components. The event streams and collection are exchanged with Network 806 having office-based users, remote users, Gateway, Internet connectivity and PSTN networks. The monitoring stack 808 has an add-on developed on SDK (software development kit) 810*a*, an SDK programming language 810*b*, a run time daemon 810*c*, a container 810*d*, a base OS 810*e*, hardware components 810*f*, among other requisite components.

The system describes the process by which the data is collected and monitoring systems. The monitoring platform has sufficient support in its SDK for model, metric, and event data, which allows the system to be adapted to different monitoring platforms. In one example, an SDK from a service provider is located in a container as a virtual machine that is run on a Linux server. The virtual machine runs on a host and sends data back. Service mesh allows containers to talk to each other and allows remote containers. The collector runs multiple containers. The containers run in a virtual machine provided by a vendor (i.e., KVM). Inside KVM they are running docker (another level of virtualization). The diagram 800 is an abstraction from the monitoring infrastructure layer. A collector will run as a virtual machine or on physical hardware having an operating system. Within the collector software, typically the collection and event/streaming receivers will be containerized. The monitoring software will use some variety of a service mesh to allow remote collector containers to securely talk over the internet with backend systems. Long term storage is handled in the backend/cloud systems. There is always some kind of short term in-memory and temporarily cached data within the collection framework. Typically, something like Redis is used to cache data before it is sent back to the backend. Also, things like IP addresses and credentials are typically cached on the remote collectors.

The server network 806 has some UC components. In some cases, it can monitor customer devices from an on-premise collector at the customer site and may monitor cloud services for customers via a collector that is managed. Thus, assisting to monitor multiple customers from a single shared collector. In cloud infrastructure, collectors monitor the "backend" systems in cloud and shared collectors that monitor multiple customers infrastructures on a single cluster of collectors. Even if a single collector is shown, it can be clustered using a virtual IP address for receiving external event/streaming data.

Figure 9:
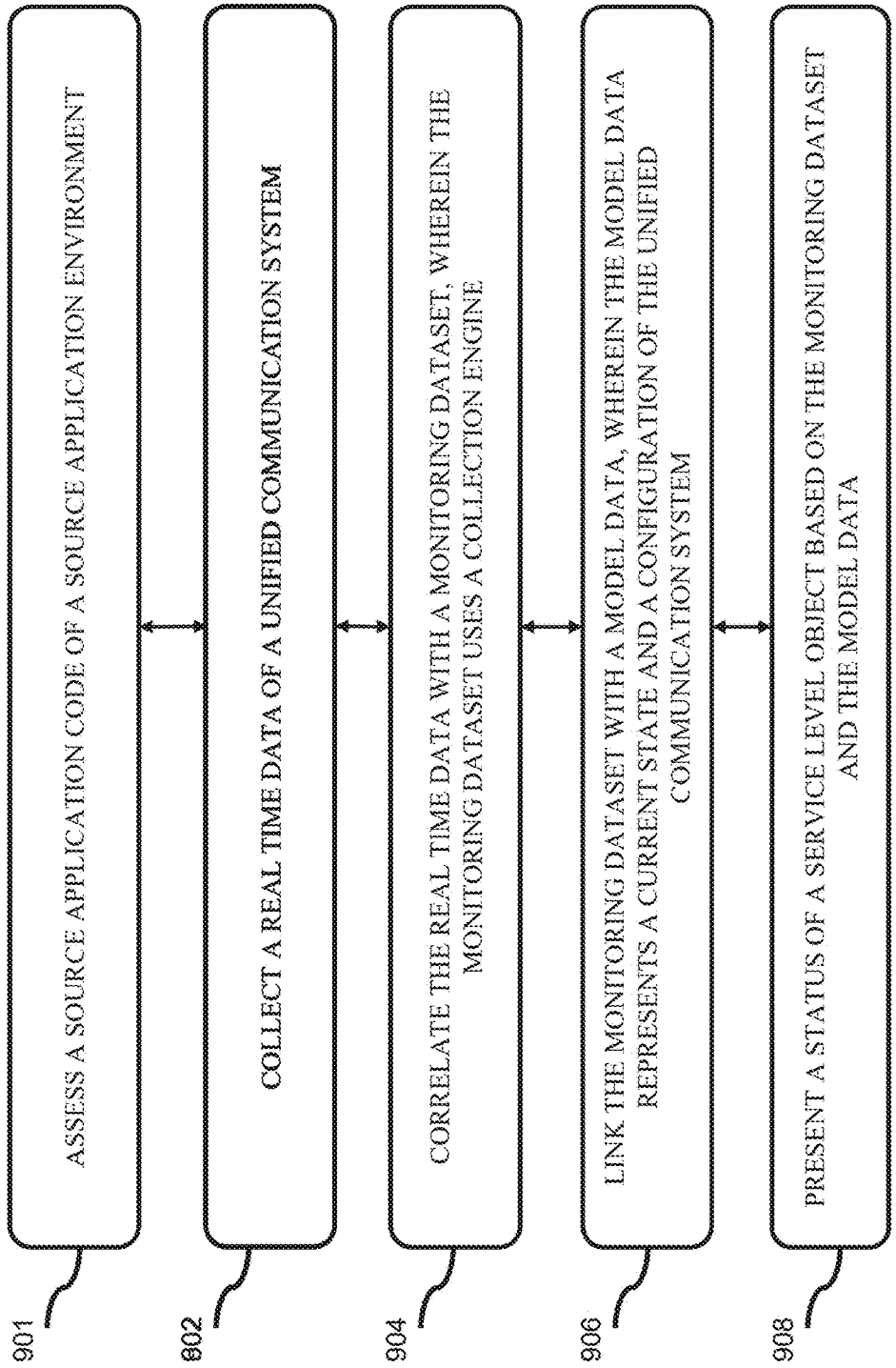
FIG. 9 illustrates an exemplary flowchart of a method of a unified communication monitoring system, in accordance with an embodiment of the present subject matter.

FIG. 9 illustrates an exemplary flowchart 900 of a method of a unified communication monitoring system, in accordance with an embodiment of the present subject matter.

In one implementation, a method 900 for unified communication monitoring is shown. The method may be described in the general context of computer executable instructions. Generally, computer executable instructions can include routines, programs, objects, components, data structures, procedures, modules, functions, scripts or others, that perform particular functions or implement particular abstract data types. The method may also be practiced in a distributed computing environment where functions are performed by remote processing devices that are linked through a communications network. In a distributed computing environment, computer executable instructions may be located in both local and remote computer storage media, including memory storage devices. The order in which the method is described is not intended to be construed as a limitation, and any number of the described method blocks can be combined in any order to implement the method or alternate methods. Additionally, individual blocks may be deleted from the method without departing from the spirit and scope of the disclosure described herein. Furthermore, the method may be implemented in any suitable hardware, software, firmware, or combination thereof. However, for ease of explanation, in the embodiments described below, the method may be implemented in the above-described system.

At step/block 901, the system first assess a source application code of a source application environment by a processor of an application server. In one implementation, the source application code may be assessed by an assessment module 160, as described above.

At step/block 902, collect a real time data of a unified communication system by a processor of a server. In one implementation, a collection engine module 110 collects a real time data of a unified communication system 100.

At step/block 904, correlate the real time data with a monitoring dataset, the monitoring dataset uses a collection engine by the processor. In one implementation, a system model module 120 correlates the real time data with a monitoring dataset, the monitoring dataset uses the collection engine module 110.

At step/block 906, link the monitoring dataset with a model data, the model data represents a current state and a configuration of the unified communication system by the processor. In one implementation, a data interfaces module 130 links the monitoring dataset with a model data, wherein the model data represents a current state and a configuration of the unified communication system 100.

At step/block 908, a status of a service level object is determined based on the monitoring dataset and the model data by the processor, when the first connectivity status of the first endpoint is negative, resetting the first endpoint to connect to the unified communications system. In one implementation, an analytics and user experience module 140 presents a status of a service level object based on the monitoring dataset and the model data.

Thus, the method 900 helps in unified communication monitoring.

In one example, as part of the suggested framework, models for CallManager, Unity Connection, Emergency Responder, and Product expressway platforms are created. Using the suggested model, techniques are provided for quick insights and analytics. These help in quickly determining the root cause for UC related endpoint (soft and hardware phone) connectivity issues. Perhaps more importantly, these analytics rule out many of the hundreds and sometimes thousands of possible causes for an outage. For using a registration analytics technique, raw data is fetched from a RIS registration API. It helps to determine (1) if the node is registered to a system geographically closest to the endpoint, (2) if the device attaching to the "preferred" server has it "failed over" to a non-preferred server, (3) if the node running the correct firmware or is ahead or behind versions, (4) if it is a software or a hardware endpoint, (5) if the device registering from a customer's network entirely to Second product or is it attaching over the internet, (6) what is the make and model of the phone, (7) what network is the phone registered from, (8) if it is the endpoint tagged as a critical endpoint (for example a blue light phone at a college) that should never be unavailable, (9) if it is the endpoint in the process of failover or fail back (Old records for past failovers/fail backs are discarded from consideration as well as old states that endpoint may have been in), (10) if the endpoint has been offline for a longer period of time than a predetermined threshold, and/or (11) whether there are other endpoints with a similar ip range having issues. Once a determination is made using this data that there is abnormal behaviour, additional analysis is done by looking at the model to determine what factors could affect the performance of the endpoints. In particular the algorithms try to rule out a connectivity related issues with the endpoints. The following are some things that are reviewed: (1) Whether there are any hardware or operating system problems with the health of the servers the endpoint may be or are currently connected do; (2) Whether there are any issues with DSP resource exhaustion. This algorithm looks at the various resources and how they are grouped together. For example, an endpoint may use DSPS to make calls; (3) whether the SIP trunks connected to external servers or telephone providers are healthy; (4) If there is anything wrong with the connectivity between the voicemail server and the call processing server; and/or (5) If there is evidence that any or all outbound calling paths are saturated by too many calls. Finally, the scope of the issue is determined, and data is rolled up into cluster and device pool level aggregates. Once this data is aggregated an additional analysis is done to determine and identify a pattern of failure. For example: Take a situation where a department of a customer is moving and on Friday night the customer powers off a switch for a floor of a building. the system determines that the average number of endpoints registered has now significantly decreased across the cluster. A cluster threshold is tripped for phone deregistrations because these are hardware and not software phones.

In addition, the system determines that the phones have not deregistered because they went into a power save mode. The cluster level alert is not presented to the NOC because the system has noticed that a device pool threshold has also tripped, and all of the endpoints are in that single device pool. The system has also noticed that these are not software phones, so it rules out that it is just "quitting time". Finally, the system sees that all the phones are coming from an IP subnet. An alert is generated that says that a single device pool has experienced a drop in hardware phone registrations, with the sample subnets provided. This tells the NOC several things but more importantly it rules out hundreds of other factors. What it indicates is that something is not catastrophically wrong with the service or the connectivity to the service. Since these are hardware phones it's not just a "quitting time" issue. The system knows that the servers are healthy, and the connectivity path is most likely healthy. The system knows that there are no servers down, that the call paths are not saturated, that there is no trunk down. In fact, the system most likely would not take the time to reach out to the customer in this case. However, if a customer called in saying that they could not make a call, by utilizing the analytics of the system described above, the system can quickly tell the customer that there are many phones on that subnet that cannot connect. The system can tell them with confidence that the infrastructure does not have any major issues. The system also can rule out things that can cause an issue for an outage like this like a gateway's DSPs being misconfigured or unavailable after the move. The service provider does not need to spend hours going through logs or setting up call traces to troubleshoot some exotic however unlikely issue.

In one example, where the model data reflects operating state and configured state of the unified communication system, In Call manager, endpoints/phones are configured to prefer to register to Call managers at cluster nodes that are geographically closest to the endpoint. They are also set up so that the load is distributed across the cluster. This preferred registration order is modelled on a daily basis because it is not changed very often. However, there are times where endpoints are manually configured incorrectly to register to the incorrect cluster nodes. There are other times where firewall rules are misconfigured or there are connectivity issues between the primary networking path between and endpoint and its preferred nodes. In this case, the modelled data is compared in near real time to the actual registration state of the endpoints. When there are too many endpoints registered to the incorrect nodes, a threshold is tripped which informs the NOC that too many endpoints are registering to the failback Call Manager Nodes. This cannot simply be done with one API call in near real time because collecting the preferred state as well as the current state in one polling cycle would violate the Api restrictions put in place to ensure that the API does not put too much load on the system. It would also make it so that polling cycles would have to be every 30 minutes instead of every 5 minutes which is achieved by separating the model from the current state. In addition, there is no state in the API indicating that end endpoint has "failed over".

Another example is firmware version monitoring. Firmware versions can be assigned by default rules as well as a series of other rules that can be defined within the system. Firmware version can be polled with the same API calls used for registration state. The API calls returning firmware version do not say that the firmware version is complying, it only gives you the firmware version. In addition to this, it's possible if you purchase a new phone that its firmware version will be greater than any version deployed by the Call Manager system. In this case, the modelling parses the rules for firmware versioning and stores the expected firmware value. Real time polling determines the currently running version. If the firmware version of the phone is older than what is expected, an event is created. However, before this is done, another check must be made to see if the firmware version running is greater than and not less than the expected firmware version. This is less trivial than it sounds because the firmware versioning does not always follow a strict standard. For example, firmware 2.1.7b on the running endpoint may need to be compared against an expected firmware version of 2.a1.6b. In addition to this, there are also known bugs with phone firmware where the reported version is incorrect. All of this logic would be very challenging to handle without pre-storing the expected firmware version and managing known buggy versions and pre-parsing version equality on the fly while collecting data in near real time.

In one example, where the monitoring dataset is a common monitoring data of events, metrics and current state, a graph is produced for each endpoint for the current registration state and if the endpoint is not registered, a graph and events are produced stating that the endpoint has deregistered and providing a reason for the deregistration. Although every endpoint status is polled every 5 minutes, there are times where endpoints will register and re-register inside of a 5 minute polling window. To catch this, two techniques are used. The first is to accept syslog events from the Call Managers that provide the state and a reason code for the deregistration. These reason codes are similar but not entirely the same as the reason codes used during polling and they overlap depending on if the endpoint is registered via SIP or SCCP. So, for example, reason code #15 may indicate for a SCCP phone that the endpoint deregistered because there was a temporary failure and the Call Manager is telling it to re-register to its preferred node. However for a SIP phone, reason code #15 may say that the endpoint is de-registered because it went into power saving mode. In this case, if the deregistration is not seen via polling because it happened inside a windows, a syslog will be generated. The syslog will have a reason code. The system will look up the endpoint and double check the reason codes based on the phone type and tag the syslog event with the correct phone name so that all polled and externally sourced (syslog) events can be seen in one view.

In another example, a SIP trunk may fail, an event will be generated by the polling if the trunk is down during polling. A syslog event showing a trunk down will also be generated. If the trunk within the monitoring GUI is selected, the syslog event will be presented in the same view as the polling events because the syslog event will be tagged with the trunk name discovered in the modeling. In the same view data can be seen from 4 different sources in one view. First, the registration state of the trunk will be generated and displayed, as well as a polled registration alert. This data is from the RIS API. Second, performance data for the trunk will be generated and displayed such as #of active call legs traversing the trunk. This is pulled from the PerfMon API. Third, the ip address that the trunk is connected to will be generated and displayed, which identified and displays which media resources it uses to speed up traffic. This data is queried via the AxL API via sql queries on a daily basis. Finally, a syslog will be generated and displayed because the event will be intercepted and tagged with the trunk name. Instead of an unreadable reason code that may conflict with the polled reason code, a text explanation will be generated and displayed because the explanation codes are looked up using the same numeric to text translation as the polling. Finally, a flapping alert may be generated and displayed if the trunk has gone up and down more than 5 times in a 24 hour period.

The specific details described above are provided to give a comprehensive understanding of the embodiments. However, it should be understood that the embodiments can be practiced without these particular details. For instance, certain elements might be represented in block diagrams to avoid unnecessary detail, thereby not obscuring the embodiments. In other cases, well-known circuits, processes, algorithms, structures, and techniques may be shown without excessive detail to keep the embodiments clear. Additionally, the embodiments may be presented as processes shown in flowcharts, flow diagrams, swim diagrams, data flow diagrams, structure diagrams, or block diagrams. Even though these diagrams may represent operations as a sequential process, many operations can be performed in parallel or concurrently. The sequence of operations may further be rearranged. A process is considered complete when the operations are finished, but it could include additional steps not illustrated in the figures. A process can refer to a method, function, procedure, subroutine, subprogram, etc. When a process is a function, its completion corresponds to returning control to the calling or main function. In firmware and software implementations, the methods may be executed using modules (e.g., procedures, functions, etc.) that perform the functions described here. Any machine-readable medium containing instructions can be used to implement the methods described herein. For example, software codes can be stored in a memory, which may be integrated within or external to the processor. The term "memory," as used here, refers to any form of long-term, short-term, volatile, nonvolatile, or other storage medium and is not limited to any specific type of memory or storage media.

Processing circuitry, computing devices, server devices, and other system components may include machine-readable media, one or more processors, programmable logic controllers, distributed control systems, secure processors, memory, and similar elements. Secure storage can be implemented using secure flash memory, secure serial EEPROM, secure field-programmable gate arrays, or secure application-specific integrated circuits. Processors can be standard central processing units or secure processors. Secure processors are special-purpose processors designed to resist advanced attacks aimed at extracting data or programming logic. A secure processor may lack debugging pins that would allow an external debugger to monitor its execution or registers. In other embodiments, systems may use secure field-programmable gate arrays, smart cards, or other secure devices. Other types of computing devices can further be utilized.

Memory can include standard memory, secure memory, or a combination of both. By using a secure processor and/or secure memory, the system can ensure that both data and instructions remain highly secure. Memory can be integrated into other components of the controller system and may store computer-executable or processor-executable instructions, including routines executed by a programmable computing device. In some embodiments, memory can store programs for preset configurations. Stored programs (e.g., simulation programs, calibration programs, graphic mapping programs, etc.) can be modified by an operator or remote manager for flexibility.

The present disclosure encompasses methods, systems, and apparatus products on any machine-readable medium for performing various operations. The embodiments described may be implemented using existing computer processors or by a special-purpose computer processor designed for the appropriate system, or by a hardwired system. Embodiments within the scope of the disclosure include program products containing machine-readable media with machine-executable instructions or data structures stored on them. Such machine-readable media can include any available media accessible by a general-purpose or special-purpose computer or other machine with a processor. Examples include RAM, ROM, EPROM, EEPROM, CD-ROM, or other optical disk storage, magnetic disk storage, or other magnetic storage devices, or any other medium used to carry or store desired program code in the form of machine-executable instructions or data structures and which can be accessed by a general-purpose or special-purpose computer or other machine with a processor. When information is transferred or provided over a network or other communication connections (wired, wireless, or a combination of both) to a machine, the machine properly views the connection as a machine-readable medium. Therefore, any such connection is properly termed a machine-readable medium. Combinations of the above are further included within the scope of machine-readable media. Machine-executable instructions include, for example, instructions and data that cause a general-purpose computer, special-purpose computer, or special-purpose processing machines to perform a certain function or group of functions. The machine-readable media can be part of sensors, computing devices, or other components disclosed herein.

Unless the word "or" is specifically limited to mean a single item exclusive from the other items in reference to a list of two or more items, the use of "or" in such a list should be interpreted as including (a) any single item in the list, (b) all of the items in the list, or (c) any combination of the items in the list. The term "comprising" is used throughout to mean including at least the recited feature(s) so that any greater number of the same feature and/or additional types of other features are not excluded. It is further understood that specific embodiments have been described herein for illustrative purposes, but various modifications can be made without departing from the technology. Furthermore, while advantages associated with certain embodiments of the technology have been described in the context of those embodiments, other embodiments may further exhibit such advantages, and not all embodiments necessarily need to exhibit such advantages to fall within the scope of the technology. Accordingly, the disclosure and associated technology can encompass other embodiments not explicitly shown or described herein. In general, in the following claims, the terms used should not be interpreted to limit the claims to the specific embodiments disclosed in the specification and the claims but should be interpreted to include all possible embodiments along with the full scope of equivalents to which such claims are entitled. Accordingly, the claims are not limited by the disclosure.

The techniques, blocks, steps, and means described above can be implemented in various ways. For instance, these techniques, blocks, steps, and means may be implemented in hardware, software, or a combination thereof. For a digital hardware implementation, the processing units may be implemented within one or more application-specific integrated circuits (ASICs), digital signal processors (DSPs), digital signal processing devices (DSPDs), programmable logic devices (PLDs), field-programmable gate arrays (FPGAs), processors, controllers, microcontrollers, microprocessors, other electronic units designed to perform the functions described above, and/or a combination thereof. Analog circuits can be implemented with discrete components or using monolithic microwave integrated circuit (MMIC), radio frequency integrated circuit (RFIC), and/or microelectromechanical systems (MEMS) technologies.

Moreover, embodiments can be implemented using hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine-readable medium such as a storage medium. A code segment or machine-executable instruction may represent a procedure, function, subprogram, program, routine, subroutine, module, software package, script, class, or any combination of instructions, data structures, and/or program statements. A code segment may be coupled to another code segment or a hardware circuit by passing and/or receiving information, data, arguments, parameters, and/or memory contents. Information, arguments, parameters, data, etc., may be passed, forwarded, or transmitted via any suitable means, including memory sharing, message passing, token passing, network transmission, etc.

The methods, systems, apparatus discussed herein are examples. Various configurations may omit, substitute, or add various procedures or components as appropriate. For example, in alternative configurations, the methods may be performed in a different order than described, and/or various stages may be added, omitted, and/or combined. Further, features described with respect to certain configurations may be combined in various other configurations. Different aspects and elements of the configurations may be combined similarly. Furthermore, technology evolves, and many of the elements are examples and do not limit the scope of the disclosure or claims. Additionally, the techniques discussed herein may provide different results with different types of context-awareness classifiers.

Unless defined otherwise, all technical and scientific terms used herein have the same meaning as commonly or conventionally understood. As used herein, the articles "a" and "an" refer to one or more than one (i.e., at least one) of the grammatical object of the article. By way of example, "an element" means one element or more than one element. "About" and/or "approximately," as used herein when referring to a measurable value such as an amount, temporal duration, and the like, encompasses variations of +20%, +10%, +5%, or +0.1% from the specified value, as such variations are appropriate in the context of the systems, devices, circuits, methods, and other implementations described herein. "Substantially," as used herein when referring to a measurable value such as an amount, temporal duration, physical attribute (such as frequency), and the like, further encompasses variations of +20%, +10%, +5%, or ±0.1% from the specified value, as such variations are appropriate in the context of the systems, devices, circuits, methods, and other implementations described herein.

As used herein, including in the claims, "and," as used in a list of items prefaced by "at least one of" or "one or more of," indicates that any combination of the listed items may be used. For example, a list of "at least one of A, B, and C" includes any of the combinations A or B or C or AB or AC or BC and/or ABC (i.e., A and B and C). Furthermore, to the extent that more than one occurrence or use of the items A, B, or C is possible, multiple uses of A, B, and/or C may form part of the contemplated combinations.

Although implementations of system and method for unified communication monitoring have been described in language specific to structural features and/or methods, it is to be understood that the appended claims are not necessarily limited to the specific features or methods described. Rather, the specific features and methods are disclosed as examples of implementations for unified communication monitoring.

The invention claimed is:

1. A method comprising:
    collecting a current state and a current configuration of a unified communication system comprising a plurality of service level objects and generating a model data comprising the current state and the current configuration of the plurality of service level objects of the unified communication system;
    deploying a first plugin to a first node of the unified communication system;
    collecting, via the first plugin, a first real time or near real time data from a first service level object coupled to the first node and a second real time or near real time data from a second service level object coupled to the first node, via at least one first communication interface;

deploying a second plugin to a second node of the unified communication system, wherein the first plugin and the second plugin comprise a collection engine;

collecting via the second plugin, a third real time or near real time data from a third service level object coupled to the second node and a fourth real time or near real time data from a fourth service level object coupled to the second node, via at least one second communication interface;

collecting, by a processor, the first real time or near real time data and the second real time or near real time data from the first plugin, via at least one third communication interface;

collecting, by the processor, the third real time or near real time data and the fourth real time or near real time data from the second plugin, via at least one fourth communication interface, wherein the processor has limited control over at least one of the at least one first communication interface, the at least one second communication interface, the at least one third communication interface, or the at least one fourth communication interface;

correlating, by the processor, each of the first real time or near real time data, the second real time or near real time data, the third real time or near real time data, and the fourth real time or near real time data, with a monitoring dataset, wherein the monitoring dataset is generated via the collection engine;

linking, by the processor, the correlated monitoring dataset with the model data;

determining, by the processor, a status of a first service level object based on the monitoring dataset and the model data;

when a first connectivity status of the first service level object is off or disconnected, resetting the first service level object to connect to the unified communications system;

setting a threshold, wherein the threshold corresponds to at least one of a number of events, or accumulated errors defined as threats; and mapping, parsing, and transforming the events, wherein the events identify changes to the model data.

2. The method of claim 1, where the first real time data or near real time data at least one of
is at least one of model data, event data, or metric data,
is collected from servers and devices, or
represents device states.

3. The method of claim 2, wherein each of the model data, the event data, and the metric data is stored in a database.

4. The method of claim 3, wherein at least one of the event data, a call detail records data, or a call management records data is pushed or streamed into an events database via the collection engine.

5. The method of claim 1, wherein the model data is collected periodically and wherein the periodic collection of model data is below a threshold set to prevent unified communications system overload.

6. The method of claim 1, wherein the model data at least one of
is collected with a reference to some entity in a model database,
reflects an operating state and a configured state of the unified communication system, or
follows a system architecture of the unified communication system.

7. The method of claim 6, wherein the first real time or near real time data regarding a service level object operating state and configured state is pulled by a plugin using a simple query.

8. The method of claim 7, wherein the plugin uses an algorithm to determine the service level operating object state based on the unified communications system being polled.

9. The method of claim 1, further comprising a third plugin, wherein at least one of real time or near real time operating system data is collected via the third plugin.

10. The method of claim 1, further comprising at least one of:
generating the model data, representing, in near real-time, a current state, a configuration, and functions of the unified communications system, a plurality of service level objects, and groups of service level objects coupled to the unified communications system,
collecting, by the processor, an additional at least one of real time or near real time data from a networking equipment to provide additional events, performance data, and analytics,
querying the model data to determine a total number of service level objects for each cluster, data center, location, or customer, via a modelling plugin,
preparing, by the processor, a user interface having a business and a technical logic for collecting the real time data, wherein the user interface has access to the monitoring data and the model data, or
identifying, by the processor, an impacted service of the unified communication system by monitoring the unified communication system, wherein the identification assists in defining the status of the first service level object.

11. The method of claim 1, further comprising at least one of:
collecting, by the processor, an additional at least one of real time or near real time data from a networking equipment to provide additional events, performance data, and analytics,
querying the model data to determine a total number of service level objects for each cluster, data center, location, or customer, via a modelling plugin,
preparing, by the processor, a user interface having a business and a technical logic for collecting the real time data, wherein the user interface has access to the monitoring data and the model data, or
identifying, by the processor, an impacted service of the unified communication system by monitoring the unified communication system, wherein the identification assists in defining the status of the first service level object.

12. The method of claim 1, wherein the model data is updated using a modelling plugin which identifies changes to components, properties of the components, and relationships, based on the configuration and the state of the unified communications system being monitored.

13. The method of claim 1, wherein the determining the status of the first service level object at least one of
is based on comparing the monitoring data to the model data and identifying information missing from the monitoring data that is present in the model data,
is completed using a number of unified communications system queries that are below a threshold set to prevent unified communications system overload, is made based on a decrease, as a percentage, of a total number of service level objects in a first group of service level objects, is made based on the first service level object failing over to a backup server; or is made based on a failure to detect the first service level object in the monitoring dataset, where the first service level object is identified in the model data.

14. The method of claim 1, wherein the transforming removes duplicate data.

15. The method of claim 1, wherein the model data comprises a virtual model of the unified communications system.

16. The method of claim 1, further comprising using artificial intelligence or machine learning to detect an anomaly in the monitoring dataset.

17. The method of claim 1, wherein the model data further comprises model intelligence.

18. A method comprising:
collecting a current state and a current configuration of a unified communication system comprising a plurality of service level objects and generating a model data comprising the current state and the current configuration of the plurality of service level objects of the unified communication system;
deploying a first plugin to a first node of the unified communication system;
collecting, via the first plugin, a first real time or near real time data from a first service level object coupled to the first node and a second real time or near real time data from a second service level object coupled to the first node, via at least one first communication interface;
deploying a second plugin to a second node of the unified communication system, wherein the first plugin and the second plugin comprise a collection engine;
collecting via the second plugin, a third real time or near real time data from a third service level object coupled to the second node and a fourth real time or near real time data from a fourth service level object coupled to the second node, via at least one second communication interface;
collecting, by a processor, the first real time or near real time data and the second real time or near real time data from the first plugin, via at least one third communication interface;
collecting, by the processor, the third real time or near real time data and the fourth real time or near real time data from the second plugin, via at least one fourth communication interface, wherein the processor has limited control over at least one of the at least one first communication interface, the at least one second communication interface, the at least one third communication interface, or the at least one fourth communication interface;
correlating, by the processor, each of the first real time or near real time data, the second real time or near real time data, the third real time or near real time data, and the fourth real time or near real time data, with a monitoring dataset, wherein the monitoring dataset is generated via the collection engine;
linking, by the processor, the correlated monitoring dataset with the model data;
determining, by the processor, a status of a first service level object based on the monitoring dataset and the model data;

when a first connectivity status of the first service level object is off or disconnected, resetting the first service level object to connect to the unified communications system; and setting a threshold, wherein the threshold corresponds to at least one of a number of events, wherein an event is determined where an average latency is greater than X at least 50% of the time over a fixed period of time.

19. A method comprising:
collecting a current state and a current configuration of a unified communication system comprising a plurality of service level objects and generating a model data comprising the current state and the current configuration of the plurality of service level objects of the unified communication system;
deploying a first plugin to a first node of the unified communication system;
collecting, via the first plugin, a first real time or near real time data from a first service level object coupled to the first node and a second real time or near real time data from a second service level object coupled to the first node, via at least one first communication interface;
deploying a second plugin to a second node of the unified communication system, wherein the first plugin and the second plugin comprise a collection engine;
collecting via the second plugin, a third real time or near real time data from a third service level object coupled to the second node and a fourth real time or near real time data from a fourth service level object coupled to the second node, via at least one second communication interface;
collecting, by a processor, the first real time or near real time data and the second real time or near real time data from the first plugin, via at least one third communication interface;
collecting, by the processor, the third real time or near real time data and the fourth real time or near real time data from the second plugin, via at least one fourth communication interface, wherein the processor has limited control over at least one of the at least one first communication interface, the at least one second communication interface, the at least one third communication interface, or the at least one fourth communication interface;
correlating, by the processor, each of the first real time or near real time data, the second real time or near real time data, the third real time or near real time data, and the fourth real time or near real time data, with a monitoring dataset, wherein the monitoring dataset is generated via the collection engine;
linking, by the processor, the correlated monitoring dataset with the model data;
determining, by the processor, a status of a first service level object based on the monitoring dataset and the model data;
when a first connectivity status of the first service level object is off or disconnected, resetting the first service level object to connect to the unified communications system; and
setting a threshold, wherein the threshold corresponds to at least one of a number of events, or accumulated errors defined as threats, wherein when the number of events exceeds the threshold, the plugin will
analyze the model data to determine a last known IP address for each endpoint; and
estimate which subnets are affected.

20. The method of claim 17, further comprising:
Determining a threshold using the model intelligence, wherein the threshold corresponds to at least one of a number of events, or accumulated errors defined as threats.

21. The method of claim 19, where the first real time data or near real time data at least one of is at least one of model data, event data, or metric data,
is collected from servers and devices, or
represents device states.

22. The method of claim 21, wherein each of the model data, the event data, and the metric data is stored in a database.

23. The method of claim 22, wherein at least one of the event data, a call detail records data, or a call management records data is pushed or streamed into an events database via the collection engine.

24. The method of claim 19, wherein the model data is collected periodically and wherein the periodic collection of model data is below a threshold set to prevent unified communications system overload.

25. The method of claim 19, wherein the model data at least one of
is collected with a reference to some entity in a model database,
reflects an operating state and a configured state of the unified communication system, or
follows a system architecture of the unified communication system.

26. The method of claim 25, wherein the first real time or near real time data regarding a service level object operating state and configured state is pulled by a plugin using a simple query.

27. The method of claim 26, wherein the plugin uses an algorithm to determine the service level operating object state based on the unified communications system being polled.

28. The method of claim 19, further comprising a third plugin, wherein at least one of real time or near real time operating system data is collected via the third plugin.

29. The method of claim 19, further comprising at least one of:
generating the model data, representing, in near real-time, a current state, a configuration, and functions of the unified communications system, a plurality of service level objects, and groups of service level objects coupled to the unified communications system,
collecting, by the processor, an additional at least one of real time or near real time data from a networking equipment to provide additional events, performance data, and analytics,
querying the model data to determine a total number of service level objects for each cluster, data center, location, or customer, via a modelling plugin,
preparing, by the processor, a user interface having a business and a technical logic for collecting the real time data, wherein the user interface has access to the monitoring data and the model data, or
identifying, by the processor, an impacted service of the unified communication system by monitoring the unified communication system, wherein the identification assists in defining the status of the first service level object.

30. The method of claim 19, further comprising at least one of:
collecting, by the processor, an additional at least one of real time or near real time data from a networking equipment to provide additional events, performance data, and analytics,
querying the model data to determine a total number of service level objects for each cluster, data center, location, or customer, via a modelling plugin,
preparing, by the processor, a user interface having a business and a technical logic for collecting the real time data, wherein the user interface has access to the monitoring data and the model data, or
identifying, by the processor, an impacted service of the unified communication system by monitoring the unified communication system, wherein the identification assists in defining the status of the first service level object.

31. The method of claim 19, wherein the model data is updated using a modelling plugin which identifies changes to components, properties of the components, and relationships, based on the configuration and the state of the unified communications system being monitored.

32. The method of claim 19, wherein the determining the status of the first service level object at least one of
is based on comparing the monitoring data to the model data and identifying information missing from the monitoring data that is present in the model data,
is completed using a number of unified communications system queries that are below a threshold set to prevent unified communications system overload,
is made based on a decrease, as a percentage, of a total number of service level objects in a first group of service level objects,
is made based on the first service level object failing over to a backup server; or
is made based on a failure to detect the first service level object in the monitoring dataset, where the first service level object is identified in the model data.

33. The method of claim 19, wherein the model data comprises a virtual model of the unified communications system.

34. The method of claim 19, further comprising using artificial intelligence or machine learning to detect an anomaly in the monitoring dataset.

35. The method of claim 19, wherein the model data further comprises model intelligence.

36. The method of claim 35, further comprising:
Determining a threshold using the model intelligence, wherein the threshold corresponds to at least one of a number of events, or accumulated errors defined as threats.

37. A method comprising:
collecting a current state and a current configuration of a unified communication system comprising a plurality of service level objects and generating a model data comprising the current state and the current configuration of the plurality of service level objects of the unified communication system;
deploying a first plugin to a first node of the unified communication system;
collecting, via the first plugin, a first real time or near real time data from a first service level object coupled to the first node and a second real time or near real time data from a second service level object coupled to the first node, via at least one first communication interface;

deploying a second plugin to a second node of the unified communication system, wherein the first plugin and the second plugin comprise a collection engine;

collecting via the second plugin, a third real time or near real time data from a third service level object coupled to the second node and a fourth real time or near real time data from a fourth service level object coupled to the second node, via at least one second communication interface;

collecting, by a processor, the first real time or near real time data and the second real time or near real time data from the first plugin, via at least one third communication interface;

collecting, by the processor, the third real time or near real time data and the fourth real time or near real time data from the second plugin, via at least one fourth communication interface, wherein the processor has limited control over at least one of the at least one first communication interface, the at least one second communication interface, the at least one third communication interface, or the at least one fourth communication interface;

correlating, by the processor, each of the first real time or near real time data, the second real time or near real time data, the third real time or near real time data, and the fourth real time or near real time data, with a monitoring dataset, wherein the monitoring dataset is generated via the collection engine;

linking, by the processor, the correlated monitoring dataset with the model data;

determining, by the processor, a status of a first service level object based on the monitoring dataset and the model data;

when a first connectivity status of the first service level object is off or disconnected, resetting the first service level object to connect to the unified communications system; and setting a threshold, wherein the threshold corresponds to accumulated errors defined as threats.

* * * * *

UNITED STATES PATENT AND TRADEMARK OFFICE
CERTIFICATE OF CORRECTION

PATENT NO. : 12,445,359 B1
APPLICATION NO. : 18/903979
DATED : October 14, 2025
INVENTOR(S) : James Patrick Sullivan et al.

Page 1 of 2

It is certified that error appears in the above-identified patent and that said Letters Patent is hereby corrected as shown below:

In the Specification

Please update the term "unified communication" to "unified communications" in the following locations:

| | | | |
|---|---|---|---|
| Column 1, Line 2 | Column 5, Line 11 | Column 10, Line 31 | Column 21, Line 61 |
| Column 1, Line 7 | Column 5, Line 14 | Column 11, Line 5 | Column 21, Line 64 |
| Column 1, Line 9 | Column 5, Line 19 | Column 11, Line 7 | Column 22, Line 27 |
| Column 2, Line 38 | Column 5, Line 22 | Column 11, Line 8 | Column 22, Line 29 |
| Column 2, Line 40 | Column 5, Line 26 | Column 11, Line 9 | Column 22, Line 38 |
| Column 2, Line 45 | Column 5, Line 30 | Column 14, Line 15 | Column 22, Line 42 |
| Column 2, Line 59 | Column 5, Line 34 | Column 14, Line 17 | Column 22, Line 51 |
| Column 2, Line 61 | Column 6, Line 6 | Column 14, Line 25 | Column 24, Line 8 |
| Column 3, Line 16 | Column 6, Line 9 | Column 14, Line 26 | Column 28, Line 44 |
| Column 3, Line 12 | Column 6, Line 11 | Column 14, Line 39 | Column 28, Line 49 |
| Column 3, Line 13 | Column 6, Line 13 | Column 14, Line 42 | |
| Column 3, Line 21 | Column 6, Line 17 | Column 15, Line 22 | |
| Column 3, Line 27 | Column 6, Line 19 | Column 17, Line 11 | |
| Column 3, Line 41 | Column 6, Line 21 | Column 17, Line 35 | |
| Column 3, Line 43 | Column 6, Line 35 | Column 17, Line 37 | |
| Column 3, Line 61 | Column 6, Line 38 | Column 17, Line 43 | |
| Column 3, Line 62 | Column 6, Line 40 | Column 17, Line 44 | |
| Column 4, Line 11 | Column 6, Line 55 | Column 19, Line 23 | |
| Column 4, Line 49 | Column 6, Line 61 | Column 19, Line 25 | |
| Column 4, Line 52 | Column 6, Line 63 | Column 19, Line 35 | |
| Column 4, Line 56 | Column 7, Line 2 | Column 19, Line 37 | |
| Column 4, Line 61 | Column 7, Line 3 | Column 19, Line 65 | |
| Column 4, Line 64 | Column 7, Line 23 | Column 20, Line 8 | |
| Column 5, Line 3 | Column 10, Line 27 | Column 20, Line 31 | |
| Column 5, Line 7 | Column 10, Line 29 | Column 21, Line 7 | |

Signed and Sealed this
Twenty-third Day of December, 2025

John A. Squires
*Director of the United States Patent and Trademark Office*

CERTIFICATE OF CORRECTION (continued)
U.S. Pat. No. 12,445,359 B1

In the Claims

Please update the term "unified communication" to "unified communications" in the following locations:
Column 28, Line 55
Column 28, Line 59
Column 28, Line 61
Column 29, Line 2
Column 29, Line 63
Column 29, Line 65
Column 30, Line 31
Column 30, Line 32
Column 30, Line 49
Column 30, Line 50
Column 31, Line 21
Column 31, Line 25
Column 31, Line 27
Column 31, Line 34
Column 32, Line 11
Column 32, Line 24
Column 33, Line 27
Column 33, Line 29
Column 33, Line 60
Column 33, Line 61
Column 34, Line 15
Column 34, Line 16
Column 34, Line 55
Column 34, Line 59
Column 34, Line 61
Column 35, Line 2